United States Patent [19]

Dixon et al.

[11] 3,968,434

[45] July 6, 1976

[54] DIGITAL TACHOMETER

[75] Inventors: George Scott Dixon, Ann Arbor; Lawrence F. Flaczynski, Ypsilanti, both of Mich.

[73] Assignee: Reliance Electric Company, Euclid, Ohio

[22] Filed: July 19, 1974

[21] Appl. No.: 489,988

[52] U.S. Cl. .............................. 324/166; 324/78 D; 235/151.32
[51] Int. Cl.² ...................... G01P 3/48; G01R 23/02
[58] Field of Search .......... 324/160, 163, 166, 162, 324/78 D; 235/151.32

[56] References Cited
UNITED STATES PATENTS

| | | | |
|---|---|---|---|
| 3,267,372 | 8/1966 | Fritzsche et al. ............... | 324/166 X |
| 3,757,167 | 9/1973 | Yoshikawa et al. ............... | 324/160 |
| 3,842,347 | 10/1974 | Terbrack ........................ | 324/78 D |

OTHER PUBLICATIONS

Polivka V., "Digital Ratemeter With the Rapid response Speed", 1971, Nuclear Science Symposium and Nuclear Power Symposium, San Francisco, Calif. USA, Nov. 3–5, 1971, pp. 545–553.

Primary Examiner—John K. Corbin
Assistant Examiner—Rolf Hille
Attorney, Agent, or Firm—David H. Wilson

[57] ABSTRACT

A tachometer for generating a digital output signal representing velocity which is a stepped approximation to a $1/t$ velocity versus time curve where $t$ is the time required to travel a fixed distance. High resolution is obtained by dividing the $1/t$ curve into octaves and an approximate straight line portion. A nonlinear counter counts a predetermined number of pulses during each octave as the time of the counting interval for succeeding octaves is doubled. Therefore, the counter total and the number of octaves completed after time $t$ represents velocity. After completing eight octaves, the nonlinear counter counts at a predetermined frequency to generate a straight line approximation of the $1/t$ curve as it approaches zero velocity. The digital output can be converted to analog form by a digital-to-analog converter and operational amplifiers having an amplification factor determined by the number of octaves completed.

33 Claims, 10 Drawing Figures

$\frac{1}{t}$ CURVE

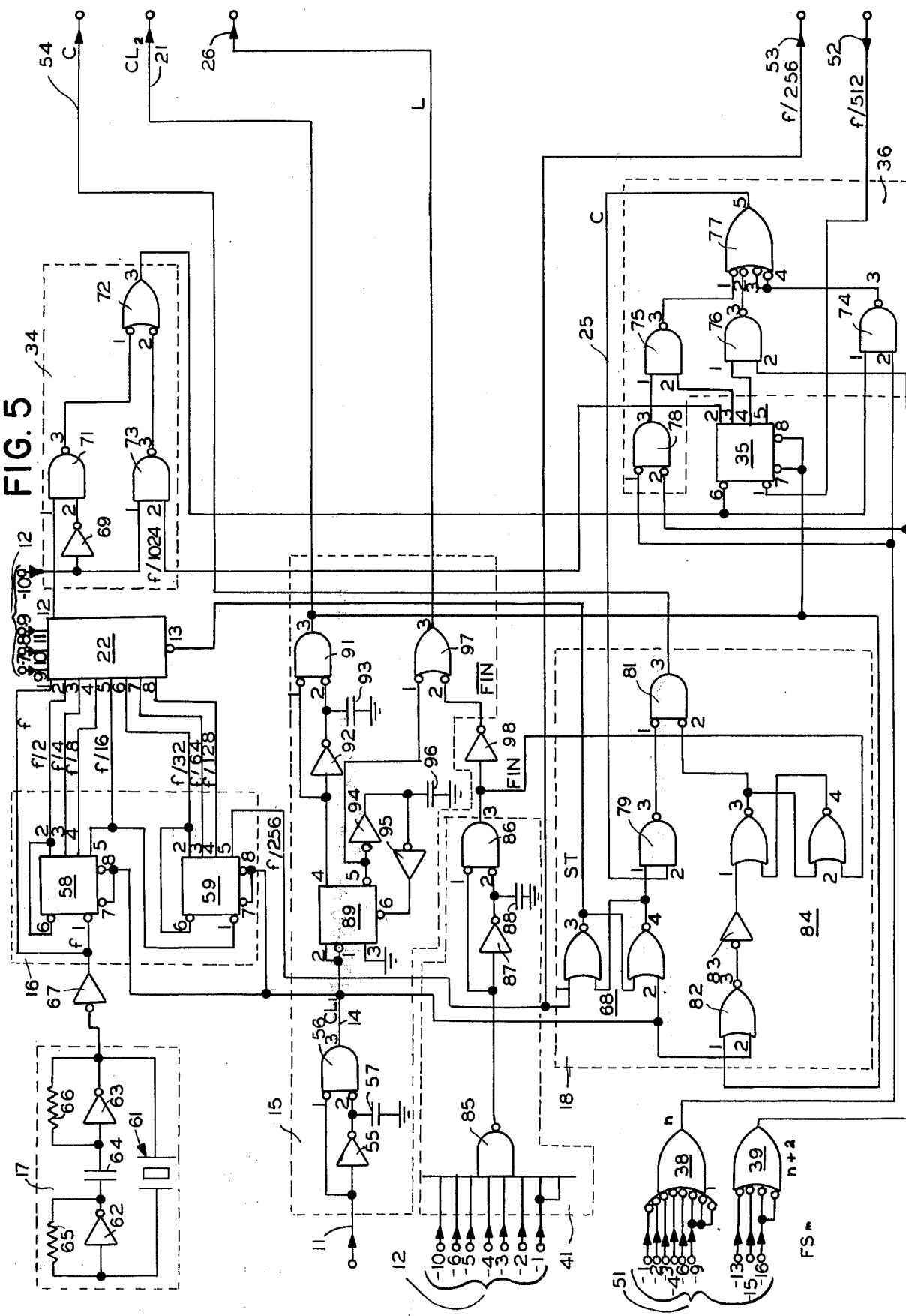

$\frac{1}{t}$ CURVE
8 BITS

DIGITAL TACHOMETER

BACKGROUND OF THE INVENTION

1. Field of the Invention

This invention relates to tachometers in general and more particularly to a digital tachometer for an object for counting down along a stepped approximation to a $1/t$ curve to determine velocity as a function of the count accumulated during an interval of displacement of the object.

2. Description of the Prior Art

The prior art tachometers which are actuated by pulses representing travel over a predetermined distance can be separated into two groups. The first group counts the number of pulses received over a fixed time interval and presents the output as a frequency which must be converted to a digital velocity by scaling or as an analog voltage from a frequency-to-voltage converter. The major disadvantage of this type of tachometer is that it is limited to applications which do not require the rapid recognition of a change in velocity since the response time is determined by the fixed time interval and the time interval must be long enough to accumulate enough pulses to provide adequate resolution at low values to velocity.

The second group of tachometers utilizes the distance input pulse to trigger a high frequency pulse train wherein the high frequency pulses are accumulated until the next input pulse stops the counting. The major disadvantage of this type of tachometer is that the accumulated count represents time which must be divided into the predetermined distance and a digital division is difficult to make.

SUMMARY OF THE INVENTION

The present invention concerns a tachometer for generating a digital output signal representing velocity which is a stepped approximation of a $1/t$ curve where $t$ is the time required for an object to travel a predetermined distance. The input to the tachometer is a train of count interval pulses which define successive counting time intervals of time $t$ in duration. A first count interval pulse initiates the accumulation of a count, at a relatively high frequency, which represents the maximum velocity which can be detected by the tachometer. The maximum velocity count is accumulated in a time interval T and then a second count accumulation is initiated in a nonlinear counter to generate the stepped approximation to the $1/t$ curve.

In order to obtain high resolution, the present invention divides the $1/t$ curve into eight octaves and an approximate straight line portion. The counting time interval for each octave is defined as $2^n(T)$ where $n$ is the number of the octave. The nonlinear counter counts a predetermined number of the higher frequency pulses during each octave as the counting time interval for successive octaves is doubled. Therefore, the nonlinear counter total and the number of octaves completed after time $t$ represents the velocity. If the eight octaves are completed during the time $t$, the nonlinear counter will count at a predetermied frequency to generate another octave of such length of steps that its first step provides an approximation of a straight line portion of the $1/t$ curve approximation as the curve approaches zero velocity.

The count interval pulses are typically generated by a pulse generator attached to the output shaft of a drive motor. Therefore, if different gear ratios are utilized for the same drive motor speed to obtain different maximum velocities, a scaling circuit can be provided to scale the higher frequency pulse train so that the new maximum velocity count total is accumulated in the same time T.

It is an object of the present invention to provide a digital indication of the velocity of an object travelling over a predetermined distance by approximating a velocity versus time curve.

It is another object of the present invention to provide a stepped approximation of a velocity versus time $1/t$ curve where $t$ is the time required for an object to travel a predetermined distance.

It is a further object of the present invention to improve the operation of a digital control system for a moving object by providing the velocity of the object in digital form.

BRIEF DESCRIPTION OF THE DRAWINGS

FIG. 5 and FIG. 6 are logic diagrams of the present invention as represented by the block diagrams of FIG. 2 and FIG. 3 wherein like numbered leads of the two diagrams are interconnected;

DESCRIPTION OF THE PREFERRED EMBODIMENT

Figure 1:
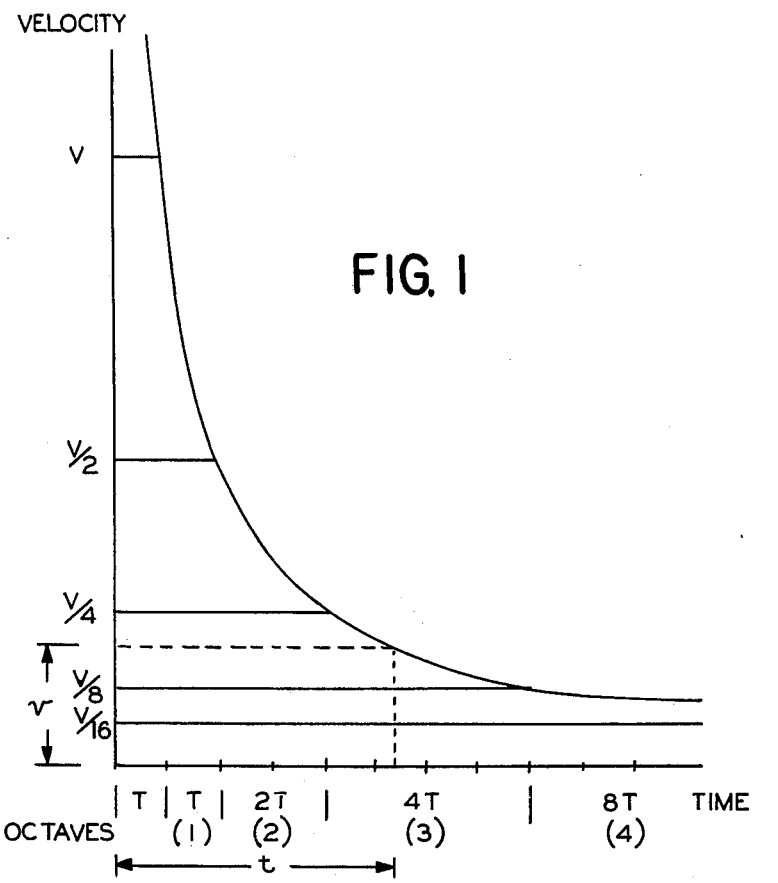
FIG. 1 is a plot of velocity against time required to travel a predetermined distance.

The present invention, as illustrated, generates digital and analog output signals approximating a velocity versus time $1/t$ curve where $t$ is the time required for an object to travel a predetermined distance. Referring to FIG. 1, there is shown a $1/t$ curve having velocity plotted against time. If T represents the time required for an object to travel the predetermined distance at maximum velocity, then the maximum velocity can be represented as V on the curve. Each doubling of the time required for the object to travel the predetermined distance reduces the velocity by ½. Therefore, if the travel time is twice the time T, the velocity will be V/2. If the travel time is four times T, the velocity will be V/4. As shown in FIG. 1, the $1/t$ curve may be divided into octaves, each octave representing twice the travel time of the preceeding octave. If $n$ represents the octave number, where $n = 0$ for the first octave, then the velocity as a function of maximum velocity V can be represented as $V/(2^n)$ at the beginning of each octave.

Figure 2:
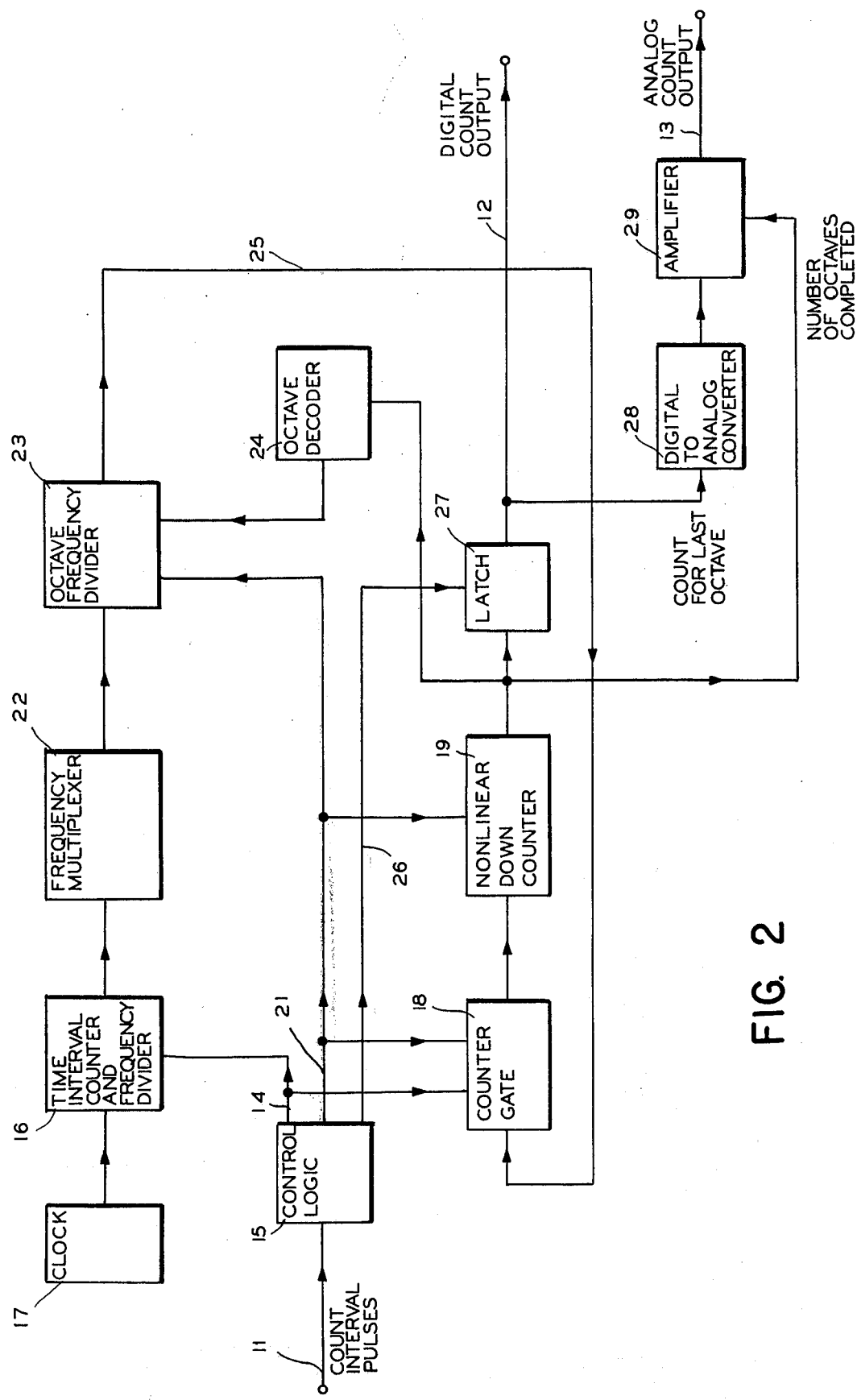
FIG. 2 is a functional block diagram of the present invention.

FIG. 2 shows a functional block diagram of the present invention with an input line 11 which receives a train of count interval pulses wherein successive pulses represent a fixed increment of displacement and define the time interval $t$ as shown in FIG. 1. High resolution is obtained by dividing the $1/t$ curve into a number of octaves and an approximation of a straight line portion. A first pulse on the line initiates counting by a nonlinear counter. During the time interval $t$, the counter will count a predetermined number of pulses from a clock during each octave as the counting interval for each octave is doubled to provide a stepped approximation of velocity represented by $y$ on the $1/t$ curve of FIG. 1. A second count interval pulse generated as the object initiates its next displacement interval terminates the first counting time interval and latches the counter output whereupon a second counting time interval is begun. The latched count total and the number of octaves completed at the end of a counting time interval $t$ represents a stepped approximation of velocity at a digital count output line 12. After completing eight octaves, the nonlinear counter counts at a predetermined frequency to produce a straight line approximation of the $1/t$ curve as it approaches zero velocity. The digital output may be converted to analog form by a digital-to-analog converter and operational amplifiers at an analog output line 13.

The count interval pulses on the input line 11 may be generated by any conventional means which provides a time interval between successive pulses that represents the time required for an object to travel a predetermined distance. For example, the pulses can be generated by a photocell and light source triggered from equally spaced apertures about the periphery of a wheel attached to the output shaft of a drive motor. The distance between adjacent apertures represents a predetermined travel distance and the time between pulses is the time required to travel that distance.

A first count interval pulse on the input line 11 generates a reset signal on a line 14 from a central logic circuit 15. The reset signal resets a time interval counter and frequency divider 16 to zero at its outputs. The counter 16 then counts pulses from a free-running clock 17 for a time interval T which defines the time interval for maximum velocity and the duration of the first octave as shown in FIG. 1. The reset signal on the line 14 also disables a counter gate 18 so that a nonlinear down counter 19 does not count during the first time interval T. The first count interval pulse on the input line 11 also generates a reset signal on a line 21 from the control logic circuit 15 after a predetermined time delay which is longer than the time required to reset the counter 16 and shorter than the time interval T. The reset signal on the line 21 resets the nonlinear counter 19 to zero at its outputs. At the end of the first time interval T, the gate 18 is enabled to pass count pulses to the counter 19. The count pulses are generated by the time interval counter and frequency divider 16 in response to the clock pulse train from the clock 17. Assuming the clock pulse train frequency to be $f$, the time interval counter and frequency divider 16 generates a plurality of count pulse frequencies $f/(2^n)$, where $n$ equals zero through seven, to provide frequencies from $f$ to $f/128$, to a frequency multiplexer 22. The frequency multiplexer 22 increments $n$ from zero to seven to pass the frequency $f/(2^n)$ during successive octaves for a total of eight octaves. An octave frequency divider 23 is enabled by the signal on the line 21 and a signal from an octave decoder 24 to further divide the $f/(2^n)$ count pulse frequency during each octave to produce periods of $f/(2^n)$, $f/(2^{n+1})$, and $f/(2^{n+2})$ count frequencies on a line 25 to approximate the $1/t$ curve.

The nonlinear count pulse train on the line 25 is passed through the counter gate 18 to the nonlinear down counter 19. The output of the counter 19 is sent to the octave decoder 24 which generates a signal to the octave frequency divider 23 to select the frequencies $f/(2^n)$, $f/(2^{n+1})$, and $f/(2^{n+2})$ in a predetermined sequence to approximate the $1/t$ curve during each octave. At the end of the eighth octave the octave frequency divider 23 receives a $f/1024$ count frequency and the counter 19 counts at that count frequency for the straight line approximation of the $1/t$ curve. At any time during the counting by the counter 19, a second count interval pulse may appear on the input line 11 to signal the end of the time interval $t$. The control logic circuit 15 will send a signal on the line 26 to a latch 27 to latch the output of the counter 19 onto the digital count output line 12. The control logic circuit 15 also rests the counter 19 wth a signal on the line 21 and resets the counter 16 with a signal on the line 14 to initiate a new time interval $t$. The count for the last octave or the straight line portion of the $1/t$ curve is changed to analog form by a digital-to-analog converter 28. The number of octaves completed by the counter 19 and the analog output of the converter 28 are supplied to an amplifier 29 which generates an analog output representing the velocity $v$ sampled during the time interval $t$ on the analog count output line 13.

Figure 3:
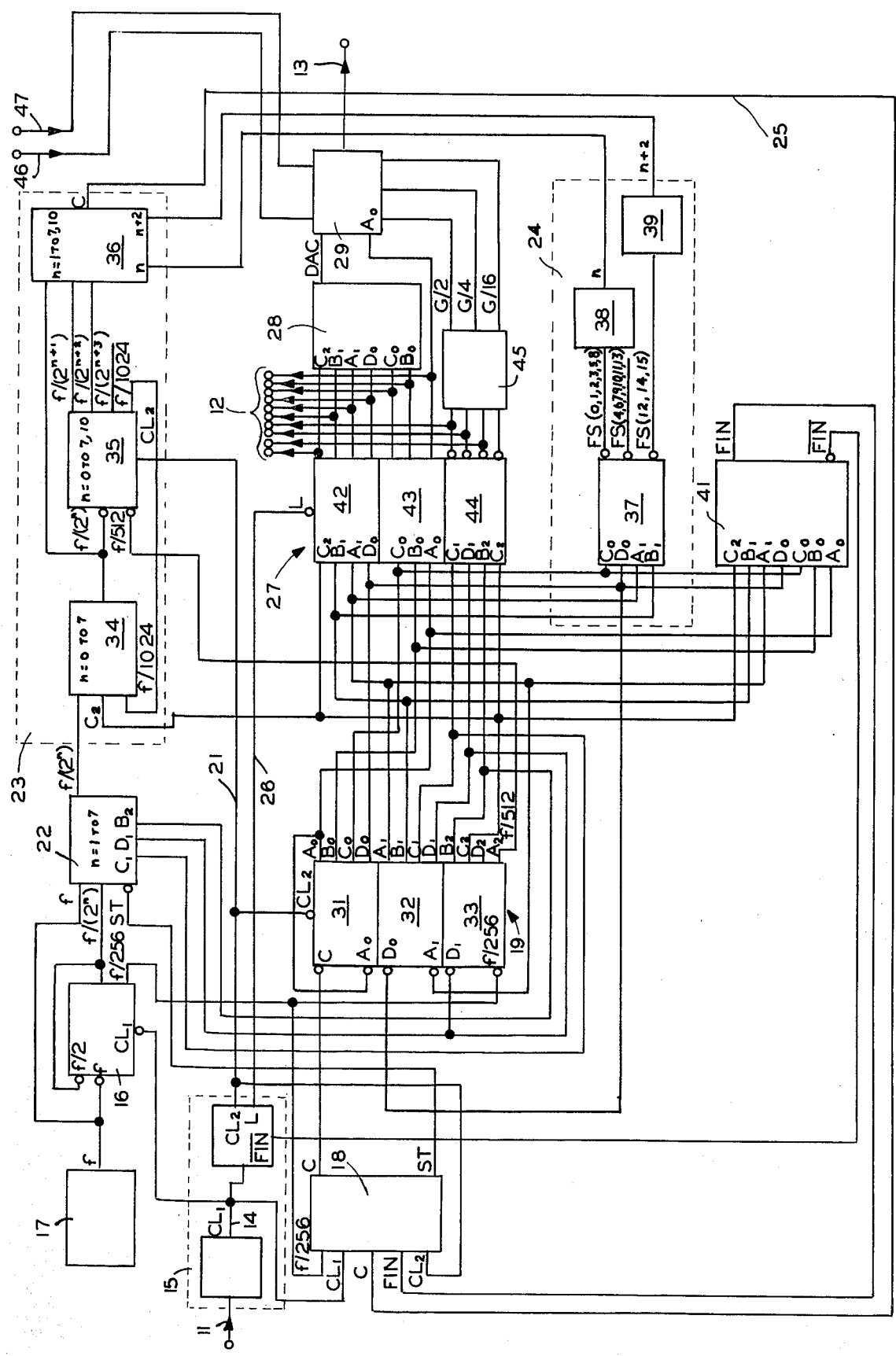
FIG. 3 is a block diagram of the present invention illustrating in more detail the signal flow between the elements of the system.

FIG. 3 is a block diagram showing the flow of signals among the elements of the present invention. The count interval pulses are received on the input line 11 and each count interval pulse generates a reset signal $CL_1$ from the control logic circuit 15 on the reset line 14. The time interval counter and frequency divider 16 is reset to zero at its outputs by the rest signal on the line 14. The clock 17 generates a train of clock pulses at a frequency $f$ to a first input of the counter 16. The $f/2$ output of the counter 16 is connected to a second input to generate output frequencies of $f/(2^n)$, where $n$ equals one to eight, when the reset signal $CL_1$ is removed from the reset line 14. The reset signal $CL_1$ on the reset line 14 is also an input to the counter gate 18 to disable the counter gate and prevent count pulses C from reaching the nonlinear down counter 19 during the time interval T.

The length of the first time interval T is the time required to count 128 clock pulses from the clock 17 at the frequency $f$ or $T = 128/f$ to represent the maximum velocity V of FIG. 1. After the counter 16 has counted the first 128 clock pulses from the clock 17, a signal is generated at the $f/256$ output of the counter 16 and is sent to an input of the counter gate 18. The $f/256$ signal enables the counter gate 18 to pass count pulses C to the nonlinear down counter 19.

The output frequency $f$ from the clock 17 and the output frequencies $f/(2^n)$, where $n$ equals one to seven, from the counter 16 are inputs to the frequency multiplexer 22. Input signals $C_1$, $D_1$ and $B_2$ are a binary coded representation of the octave number as generated by the nonlinear down counter 19. During the first octave, the input signals will all be at zero to address the $f$ input to multiplexer 22 which generates an output signal at a frequency of $f/(2^0)$ or $f$. During the second octave the address will be one where $C_1 = 1$ while $D_1$ and $B_2$ are zero to select the $f/(2^1)$ or $f/2$ input frequency which is then generated at the output of the multiplexer 22. Since the clock frequency output from the multiplexer 22 has been doubled for the second octave, the counting time interval for the second octave will also be doubled to 2T. As the address signals are incremented, the clock frequency will be doubled so that during the eighth octave the clock frequency will be $f/128$ and the counting interval for the eighth octave will be 128 times the counting interval of the first octave counting interval T. The frequency multiplexer 22 is enabled by a strobe signal ST from the counter gate 18 when the nonlinear counter 19 is to count.

The nonlinear counter 19 receives count pulses C from the counter gate 18 at frequencies determined by the frequency multiplexer 22 and the octave frequency divider 23. The nonlinear counter 19 is comprised of three counter sections 31, 32, and 33 connected in series. The counter section 31 receives the count pulses C at a first input and has an output $A_0$ connected to a second input to operate as a ripple-through counter generating the output signals $A_0$, $B_0$, $C_0$ and $D_0$ representing the number of C count pulses received divided by multiples of 2. Therefore, $A_0 = C/2$, $B_0 = C/4$, $C_0 = C/8$ and $D_0 = C/16$. The $D_0$ output of the counter section 31 is connected to a first input of the counter section 32 while the $A_1$ output is connected to a second input so that the counter section 32 also operates as a ripple-through counter where $A_1 = C/32$, $B_1 = C/64$, $C_1 = C/128$ and $D_1 = C/256$. Finally, the $D_1$ output of the counter section 32 is connected to a first input of the counter section 33 to generate the output signals $B_2 = C/512$, $C_2 = C/1024$ and $D_2 = C/2048$. A second input to the counter section 33 receives the $f/256$ signal from the counter 16 and produces an $f/512$ signal at output $A_2$ which is an input to the octave frequency divider 23.

The outputs of the counter sections 31, 32, and 33 switch between 0 and 1 logic levels as the count pulses C are counted. For example, output $A_0$ switches logic levels for every pulse counted while output $B_0$ switches for every two pulses counted and output $D_2$ switches for every 1024 pulses counted. Since $C_1$ is the least significant bit in the address for the frequency multiplexer 22, that address will be incremented for every 64 count pulses counted to define the octaves as 64 count pulses long as counted by the nonlinear down counter 19. The incrementing of the address generates a $f/(2^n)$ basic count frequency which doubles the counting time for the counter 19 for each successive octave of the $1/t$ curve shown in FIG. 1.

The octave frequency divider 23 includes an octave/-straight line portion gate 34, a frequency divider 35 and a frequency selector 36. The inputs to the octave/-straight line portion gate 34 are the $f/(2^n)$ pulse train from the frequency multiplexer 22, the $C_2$ output from the counter section 33 and the $f/1024$ pulse train from the frequency divider 35. During the first 512 count pulses C, the $C_2$ output will be at the 0 logic level and the gate 34 will pass the $f/(2^n)$ frequency to its output. Since each octave is defined by 64 count pulses, the 512 count pulses C represent the eight octaves of the first portion of the $1/t$ curve. During the second 512 count pulses C the $C_2$ output will be at the 1 logic level to inhibit the $f/(2^n)$ frequency and pass the $f/1024$ frequency to the output to define what amounts to the straight line portion of the $1/t$ curve.

The frequency divider 35 receives the $f/(2^n)$ pulse train from the octave/straight line portion gate 34 and divides the frequency by two and four to generate $f/(2^{n+1})$ and $f/(2^{n+2})$ frequencies respectively. During the octave portion of the $1/t$ curve, $n$ will be incremented from zero to seven and during the essentially straight line portion of the curve, $n$ will equal ten to obtain $f/1024$. A second input to the frequency divider 35 receives the $f/512$ signal from the $A_2$ output of the counter section 33 and divides it by to generate the $f/1024$ signal for the octave/straight line portion gate 34. The frequency divider is reset by the reset signal $CL_2$ from the control logic circuit 15 on the line 21.

The frequency selector 36 receives the $f/(2^n)$ pulse train from the gate 34 and the $f/(2^{n+1})$ and $f/(2^{n+2})$ pulse trains from the frequency divider 35. A pair of signals, $n$ and $n+2$ from the octave decoder 24 determines which one of the three input frequencies will be sent out as the count pulses C to the counter gate 18 on the line 25. If the $n$ signal is at logic 1 and the $n+2$ signal is at logic 0, then $C = f/(2^n)$. If both the $n$ and $n+2$ signals are at logic 0 then $C = f/(2^{n+1})$. Finally, if the $n$ signal is at logic 0 and the $n+2$ signal is at logic 1, then $C = f/(2^{n+2})$.

Figure 4:
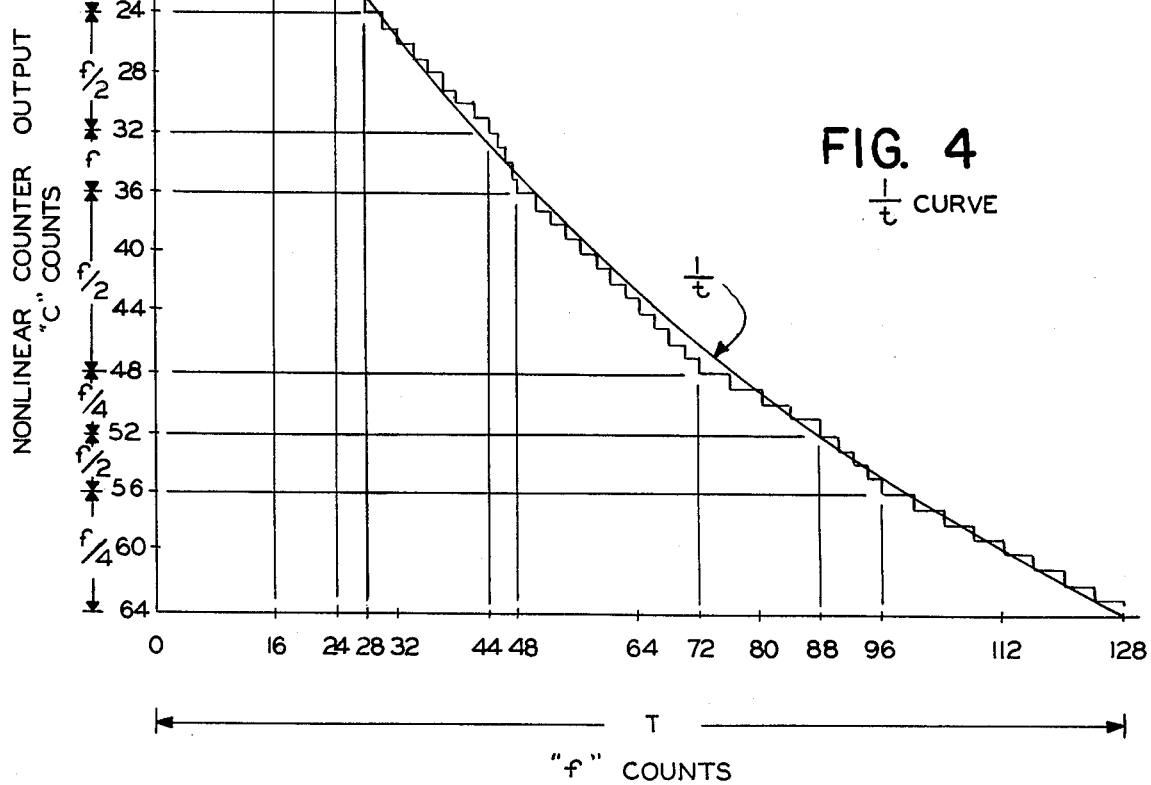
FIG. 4 is a plot of the stepped approximation of a velocity versus time $1/t$ curve according to the present invention.

The octave decoder 24 includes a count decoder 37 and a pair of NAND gates 38 and 39. The count decoder 37 receives the $C_0$, $D_0$, $A_1$ and $B_1$ output signals from the counter sections 31 and 32 of the nonlinear down counter 19 as a binary address for selecting one of sixteen output lines $FS_0$ to $FS_{15}$. Since the $C_0$ signal is the least significant bit, the address will change every four count pulses C as the $C_0$ output switches between the logic 0 and logic 1 states during counting by the nonlinear down counter 19. Therefore, each of the 16 outputs from the count decoder will be selected in sequence for four pulse counts C during each 64 pulse count octave. $FS_m$ designates the output lines from the decoder 37 where $m$ is the decimal equivalent of the binary address for the count decoder 37. When one of the $FS_m$ lines connected to the NAND gate 38 is selected, $m = 0, 1, 2, 3, 5,$ and 8, the gate 38 generates a logic 1 to the frequency selector 36 and $C = f/(2^n)$. When one of the $FS_m$ lines connected to the NAND gate 39 is selected $m = 12, 14$ and 15, the gate 39 generates a logic 1 to the frequency selector 36 and $C = f/(2^{n+2})$. When one of the $FS_m$ lines not connected to the gates is selected, $m = 4, 6, 7, 9, 10, 11,$ and 13, both gates generate a logic 0 and $C = f/(2^{n+1})$. This sequence of counting generates a stepped approximation of the $1/t$ curve as shown in FIG. 4 which will be discussed later.

Since the $1/t$ curve defines zero velocity as requiring an infinite time interval $t$, the straight line portion of the stepped approximation of the curve is required to stop the counting after a predetermined time interval and define that point as zero velocity. A zero velocity detector 41 has as its inputs the $A_0$, $B_0$, $C_0$, $D_0$, $A_1$, $B_1$ and $C_2$ outputs from the nonlinear counter 19. When all the inputs are at logic level 1 a FIN signal is sent to the counter gate 18 to inhibit the gate from passing the count pulses C to the nonlinear counter 19. The $C_2$ input will become logic level 1 after 512 count pulses C which define the eight octaves. The rest of the inputs will all be at logic level 1 after 64 more count pulses C which are counted during the straight line portion of the curve which may be referred to as a ninth octave.

Therefore, if the input pulses are being received on input line 11 more than a predetermined time interval apart, the zero velocity detector 41 will terminate the nonlinear count with a FIN signal at the counter gate 18.

The output signals from the nonlinear counter 19 are stored in the latch 27 before the counter 19 is reset for another counting cycle. Either a second count interval pulse on the input line 11 or a $\overline{\text{FIN}}$ signal from the zero velocity detector 41 will signal the end of the time interval $t$ and the control logic 15 will generate a L latch signal on the line 26 to latch the data into the latch 27. The latch 27 includes three latch sections 42, 43 and 44 which are connected in parallel to the outputs of the counter sections 31, 32 and 33. The latch sections 42 and 43 store the data from the outputs $A_0$, $B_0$, $C_0$, $D_0$, $A_1$ and $B_1$ which are the count pulse C total for the octave during which counting was terminated. The output $C_2$ represents the completion of the first eight octaves and is stored in the latch section 42 and the latch section 44. The latch section 44 also stores the $C_1$, $D_1$ and $B_2$ outputs which are the address for the frequency multiplexer 22 and represent the number of octaves completed.

The latch 27 output signals represent the digital count output as the number of completed octaves and the count for the octave which may have been interrupted. This data is available on the output lines 12. The $B_0$, $C_0$, $D_0$, $A_1$, $B_1$ and $C_2$ signals are also the inputs to the digital-to-analog converter 28 which generates an analog signal DAC proportional to its digital input. The $C_1$, $D_1$, $B_2$ and $C_2$ signals from the latch section 44 are the inputs to an octave decoder and amplifier switch 45 which decodes the digital representation of the number of octaves completed and generates switch signals G/2, G/4 and G/16 to control the amplification of the amplifier 29. The DAC signal from the digital-to-analog converter 28 and the $A_0$ signal from the latch section 43 are combined in the amplifier with a signal representing the number of octaves completed to generate an analog count output signal on the line 13. The signals on an up direction line 46 and a down direction line 47 representing direction of travel of an object, typically an elevator, determine the polarity of the analog output signal on the line 13 which represents the velocity of the elevator car.

FIG. 4 is a plot of the $1/t$ curve for the first octave and a stepped approximation thereof. The $FS_0$ to $FS_3$ outputs of the count decoder 37 are connected to the NAND gate 38 to signal the frequency selector 36 to pass C counts at the frequency $f$. Therefore, the first 16 $f$ count pulses will generate 16 C count pulses which are accumulated by the nonlinear counter 19. The $FS_4$ output is not connected to either of the NAND gates 38 or 39 and the frequency selector will pass C counts at the frequency $f/2$. Therefore, the next eight $f$ count pulses will generate four C count pulses which are accumulated to total 20 in the nonlinear counter 19. Each of the output lines from the count decoder 37 produces a signal for four C count pulses to generate the stepped approximation as shown in FIG. 4 for the first octave during the first 128 $f$ count pulses for a total of 64 C count pulses. During the second octave, $n = 1$ and the $f/(2^n)$ frequency is $f/2$ so that the counting time interval becomes 2T or 256 $f$ count pulses which generate the 64 C count pulses for the nonlinear counter 19. Each successive octave will have a doubled counting time interval so that the eighth octave has a counting time interval of 128T wherein 16,384 $f$ count pulses are required to generate the 64 C count pulses. The eight octaves provide a stepped approximation of the $1/t$ curve as shown in FIG. 1. During the ninth octave or straight line portion of the $1/t$ curve, $n = 10$ so that the counting time interval becomes 512T or 131,072 $f$ count pulses which generate the 64 C count pulses for the nonlinear counter 19. Referring to FIG. 4, it may be seen that during the ninth octave the time base will be greatly expanded so that the $1/t$ curve actually approximates a straight line.

Figure 6:
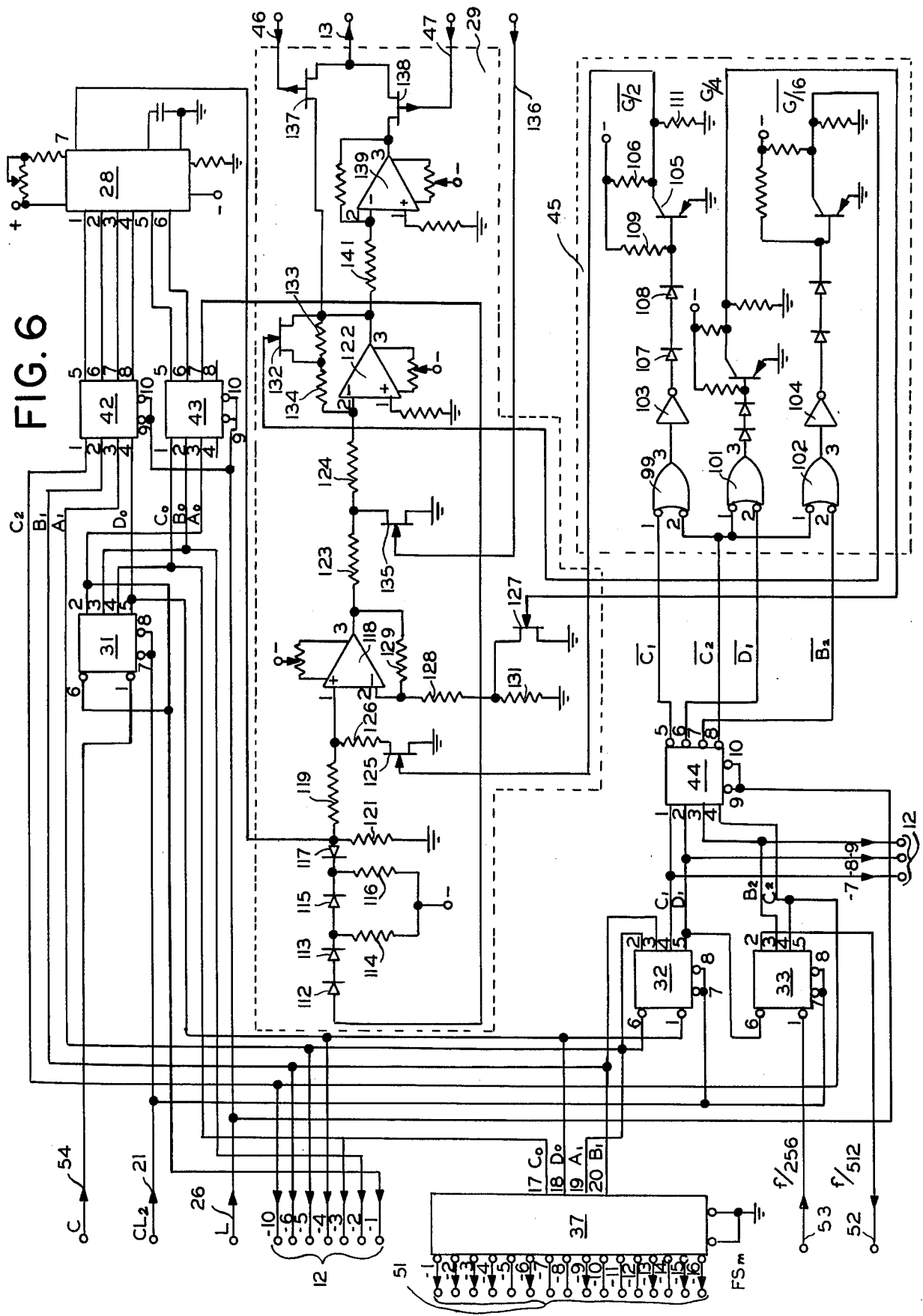

FIG. 5 and FIG. 6 are logic diagrams of the present invention as represented by the block diagrams of FIG. 2 and FIG. 3. The input line 11 of FIG. 5 receives a train of count interval pulses which define the counting time intervals. After a time delay, the control logic circuit 15 responds to the first count interval pulse by generating a $CL_1$ reset signal on line 14. Also after a predetermined time delay, the control logic circuit 15 generates a $CL_2$ reset signal on line 21 to FIG. 6 to reset the nonlinear counter sections 31, 32 and 33. Finally, the control logic circuit 15 generates a latch signal L on line 26 to FIG. 6 to latch sections 42, 43 and 44 to latch in the center section data from the previous counting time interval.

The circuit of FIG. 5 also receives the $A_0$, $B_0$, $C_0$, $D_0$, $A_1$, $B_1$ and $C_2$ output signals from the counter sections of FIG. 6 on the digital count output lines 12 which are connected to the zero velocity detector 41. The frequency multiplexer 22 receives $C_1$, $D_1$ and $B_2$ output signals from the counter sections of FIG. 6 as an input line address and the octave/straight line portion gate 34 receives the $C_2$ signal. The NAND gate 38 and 39 receive the $FS_m$ signals on a group of lines 51 from the count decoder 37 of FIG. 6. The frequency divider 35 receives the $f/512$ signal on a line 52 from the counter section 33 of FIG. 6. The $f/512$ signal is generated in response to the $f/256$ signal from the counter 16 which is sent to the counter section 33 on line 53. The final output from the circuit of FIG. 5 is a line 54 from the counter gate 18 which carries the C count pulses to the counter section 31 of FIG. 6. In addition to those input and output lines common to FIG. 5 and FIG. 6, the circuit of FIG. 6 also includes the digital count output lines 12 and the analog output line 13.

In the following description of the circuits, a 1 will be utilized to designate a logic true or positive logic signal and a 0 will be utilized to designate a logic false or negative logic signal. The functions of each type of circuit element will be defined when it is encountered for the first time in the description of the signal flow. Where there is a plurality of input or output lines or where an element has more than one input and/or output lead, the separate lines will be designated with a —X where X is a number. For example, the digital count output lines 12 are designated 12-1 through 12-10 respectively and the frequency multiplexer 22 has inputs and outputs 22-1 through 22-13.

Initially, the input line 11 is assumed to be receiving no count interval pulses and is at 0. In the control logic circuit 15, the logic element 55 is an inverter which changes a 0 to a 1 and a 1 to a 0. The element 56 is a negative logic NOR gate which generates a 1 at output 56-3 when inputs 56-1 and 56-2 are at 0 and generates a 0 for any other combination of input signals. The 0 on the input line 11 is changed to a 1 by the inverter 55 and capacitor 57 is charged to 1 at the input 56-1 of NOR 56 to generate a 0 at output 56-3 which is the absence of the $CL_1$ reset signal on the line 14.

When the object begins to move, the count interval pulse source begins to generate 1 pulses on the input line 11. The first 1 pulse will be changed to a 0 by inverter 55 but will be delayed from reaching the input 56-2 by the time required to discharge the capacitor 57. However, since input 56-1 is at 1 the output 56-3 of NOR 56 will remain at 0. At the trailing edge of the count interval pulse the input line 11 will return to 0 which is applied to the input 56-1. The 0 is changed to a 1 by the inverter 55 but it will be delayed from reaching the input 56-2 by the time required to charge the capacitor 57 or $t_1$. Therefore, for a period of time $t_1$ both inputs will be at 0 and the output 56-3 will be at 1 to generate the $CL_1$ reset pulse. When the capacitor 57 has charged to 1, the output 56-3 will return to 0 to remove the $CL_1$ reset pulse.

The counter 16 includes a pair of four-bit binary counters 58 and 59. The counter 58 has an input 58-1 for receiving the train of 1 pulses from the clock 17. The trailing edge of each input pulse triggers a change in the outputs 58-2 through 58-5. The input frequency $f$ is divided by two at the output 58-2 which switches between 0 and 1 in response to each input pulse. The outputs 58-3, 58-4 and 58-5 provide division by two, four and eight respectively. If the output 58-2 is connected to the input 58-6, the counter 58 will perform as a ripple-through counter and the outputs 58-2 through 58-5 will provide the signals $f/2$, $f/4$, $f/8$ and $f/16$ respectively. The counter 59 is connected as a ripple-through counter in series with the counter 58 and receives the $f/16$ signal at input 59-1 to provide the signals $f/32$, $f/64$, $f/128$ and $f/256$ from the outputs 59-2 through 59-5 respectively. The 1 $CL_1$ reset signal on line 14 is present at reset inputs 58-7, 58-8, 59-7 and 59-8 to reset the counter outputs to 0. When the $CL_1$ reset signal is removed, the 0 at the reset inputs enables the counters to count.

The clock 17 is free-running and produces a pulse train with a frequency $f$ which is determined by the crystal 61. Assuming that the side of the crystal 61 that is connected to the input of an inverter 62 is set at 0 and the side of the crystal 61 that is connected to the output of an inverter 63 is at 1, then the output of the inverter 62 will be at 1 and the input of the inverter 63 will be at 0 to charge the capacitor 64. When the crystal 61 oscillates, the signals are reversed and the capacitor 64 discharges to 0 at the output of the inverter 62 through a resistor 65 to the input of inverter 62 which then receives a 1 from the crystal 61. At the same time the capacitor 64 must charge to 1 at the input to the inverter 63 through a resistor 66 from the output of inverter 63 which then receives a 0 from the crystal 61. The next cycle of the crystal reverses the signals to produce an alternating train of 0 and 1 signals which are reversed in order by the inverter 67 which provides a signal level sufficient to drive the counters 58 and 59.

The clock pulse train $f$ and the counter output signals $f/(2^n)$, where $n$ is one to seven, are connected to the inputs 22-1 through 22-8 respectively of the frequency multiplexer 22. A binary address on the digital count output lines 12-7, 12-8 and 12-9 is received at the address inputs 22-9, 22-10 and 22-11 respectively to select one of the input frequencies which then appears on the output line 22-12. The multiplexer is only enabled to select a frequency when there is a 0 ST strobe signal at strobe input 22-13 which is generated by the counter gate 18. The counter gate 18 generates the strobe signal in response to the $CL_1$ reset signal on line 14 and the $f/256$ signal from output 59-8 of the counter 16.

Element 68 is a NOR flip-flop which includes a pair of cross-coupled NOR gates. If there are 1 signals at both inputs 68-1 and 68-2, both outputs will be at 0. If input 68-1 receives a 0, output 68-3 will change to 1. If instead input 68-2 receives a 0, output 68-4 will change to 1. Finally, if after one input has received a 0 the other input receives a 0, the output will remain in the states they had assumed when the first input changed. Before the first count interval pulse on input line 11 it is assumed that the line 14 is at 0 and the output 59-5 is also at 0 but had been 1 so that output 68-3 is at 0 and output 68-4 is at 1. The 1 $CL_1$ reset signal on line 14 generated in response to the first count interval pulse will change input 68-2 to inhibit the frequency multiplexer 22. When the reset signal $CL_1$ is removed from line 14, output 68-3 will remain at 1 as the counter 16 counts at a frequency of $f$. After 128 counts, the $f/256$ signal will change from 0 to 1 at input 68-1 to reset the output 68-3 0 and enable the frequency multiplexer 22. The 128 counts defines the time T for maximum velocity and allows the nonlinear counter 19 to be reset and the data from the previous counting time interval to be latched.

The $f/(2^n)$ signal from the frequency multiplexer output 22-12 is received by the octave/straight line portion gate 34. The gate 34 also receives the $C_2$ signal on digital count output line 12-10 from the counter section 33 of FIG. 6. During the first 512 counts by the nonlinear counter the output line 12-10 will be at 0 which is changed to a 1 by an inverter 69 at an input 71-2 of a NAND gate 71. The NAND gate has a 0 output when both inputs are at 1 and a 1 output for any other combination of inputs. Therefore, during the first 512 counts, the NAND gate 71 will pass the output from the frequency multiplexer in inverted form to an input 72-1 of a negative logic NAND gate 72. The 0 on line 12-10 is also present at an input 73-1 of a NAND gate 73 to generate a 1 at an output 73-3 to an input 72-2 of the NAND gate 72 to enable it to pass the frequency multiplexer output with another inversion. Therefore, the output of the octave/straight line portion gate 34 will be the $f/(2^n)$ frequency pulse train selected by the address on the lines 12-9, 12-10 and 12-11. Since the address is incremented by one for each subsequent octave, the frequency of the output of the gate 34 will be halved for each octave from the $f$ to $f/128$ to double the counting time of the nonlinear counter. During the second 512 counts, the line 12-10 will be at 1 which is changed to 0 by inverter 69 to generate a 1 at the output 71-3 of the NAND gate 71 and enable the NAND gate 72 at the input 72-1. The 1 on line 12-10 enables the NAND gate 73 to pass the $f/(2^{10})$ or $f/1024$ frequency pulse train in inverted form which is then inverted by the NAND gate 72 to generate the straight line portion of the $1/t$ curve.

The $f(2^n)$ pulse train output from the gate 34 is the input at the frequency divider 35 which is a four-bit binary counter. The pulse train at an input 35-6 is divided by two and four at a pair of outputs 35-3 and 35-4 respectively which are connected to the frequency selector 36. The $f/512$ frequency pulse train is received on the line 52 from the circuit of FIG. 6 and is present at an input 35-1 to be divided by two at an output 35-2 to generate the $f/1024$ frequency pulse train for the gate 34. The frequency divider 35 is reset by a 1 at a pair of reset inputs 35-7 and 35-8 when the $CL_2$ reset signal is generated by the control logic circuit 15 to reset the nonlinear counter sections of FIG. 6 on the line 21.

The $f/(2^{n+1})$ signal at the output 35-3 and the $f/(2^{n+2})$ signal at the output 35-4 along with the $f/(2^n)$ signal from the gate 34 are inputs to the frequency selector 36 which generates the C count pulses on the line 25 to the counter gate 18. The frequency selector 36 includes three NAND gates 74, 75 and 76 which are enabled by the NAND gate 38 and 39 to pass the $f/(2^n)$, $f/(2^{n+1})$ and $f/(2^{n+2})$ signals respectively to a negative logic NAND gate 77. When $m$ is equal to 0, 1, 2, 3, 5 or 8 one of the $FS_m$ lines 51 will be at 0 to generate a 1 from the output of the NAND gate 38 which enables the NANd gate 74 at an input 74-2 to pass the $f/(2^n)$ signal in inverted form to a pair of inputs 77-3 and 77-4 of the NAND gate 77. The 1 from the NAND gate 38 also is present at an input 78-1 of a negative logic NOR gate 78 to produce a 0 from an output 78-3 at an input 75-1 of the NAND gate 75. This inhibits the NAND gate 75 from passing the $f/(2^{n+1})$ signal on an input 75-2 to the NAND gate 77 and in turn generates a 1 at an output 75-3 to an input 77-1 to enable the NAND gate 77. During this time the NAND gate 39 generates a 0 to an input 76-2 to inhibit the NAND gate 76 from passing the $f/(2^{n+2})$ signal on an input 76-1 to the NAND gate 77 and in turn generates a 1 at an output 76-3 to an input 77-2 to also enable the NAND gate 77 which passes the $f/(2^n)$ signal onto the line 25 at an output 77-5 by inverting the output from the NAND gate 74. When $m$ is equal to 4, 6, 9, 10, 11 or 13 all of the inputs to the NAND gates 38 and 39 will be at 1 to generate a 0 at the input 74-2 and the input 76-2 to inhibit the $f/(2^n)$ and $f/(2^{n+2})$ signals respectively. The NAND gate 74 and 76 generate a 1 at the inputs 77-2, 77-3, and 77-4 to enable the NAND gate 77. The inputs 78-1 and 78-2 of the NOR gate 78 are both at 0 to generate a 1 from the output 78-3 at the input 75-1 to enable the NAND gate 75 to pass the $f/(2^{n+1})$ signal from the output 35-3 at the input 75-2 in inverted form to the input 77-1. The NAND gate 77 inverts the output from the NAND gate 75 to generate the $f/(2^{n+1})$ frequency signal on line 25. Finally, when $m$ equals 12, 14, or 15 one of the inputs to NAND gate 39 will be at 0 to generate a 1 at the input 76-2 to enable the NAND gate 76 to pass the $f/(2^{n+2})$ frequency signal in inverted form to the input 77-2. Since the inputs 74-2 and 78-1 are at 0 the NAND gate 77 will be enabled to invert the output of the NAND gate 76 and pass the $f/(2^{n+2})$ frequency signal onto line 25.

The line 25 carrying the C count pulses is connected to an input 79-2 of a NAND gate 79 of the counter gate 18. When the $f/256$ signal from the binary counter output 59-5 changes to 1 at the input 68-1 of the NOR flip flop 68, the output 68-4 changes from 0 to 1 to enable the NAND gate 79 at an input 79-1 to pass the C count pulses in inverted form from an output 79-3 to an input 81-1 of a negative logic NOR gate 81. The $CL_2$ reset pulse which is generated on the line 21 to reset the nonlinear counter and which resets the frequency divider 35 is also present at an input 82-1 of a NOR gate 82 of the counter gate 18. Another input 82-2 receives the $CL_1$ reset signal on the line 14. Before the $CL_1$ reset signal is generated, both inputs are at 0 and the NOR 82 generates a 1 which is changed to a 0 by an inverter 83 at an input 84-1 of a NOR flip-flop 84. Another input 84-2 receives a 0 FIN signal from the zero velocity detector 41. When the 1 $CL_1$ reset signal is received at the input 82-2 of the NOR gate 82 a 0 is generated which is changed to a 1 by the inverter 83 to set the NOR flip-flop 84 and generate a 0 from an output 84-3 to an input 81-2 of the NOR gate 81 to enable it. When the NAND gate 79 is enabled by the NOR flip-flop 68 in response to the $f/256$ signal, the NOR gate 81 will invert the output from the NAND gate 79 and generate the C count pulses on the line 54 to the counter section 31 of FIG. 6. The C count pulses will be removed from the line 54 when a subsequent $CL_1$ reset signal is generated to reset the NOR flip-flop 68 which then would generate a 0 at the output 68-3 to disable the NAND gate 79 or when the counting is finished and the zero velocity detector 41 generates a 1 FIN signal to reset the NOR flip-flop 84 which then would generate a 1 at the output 84-3 to disable the NOR gate 81.

As the speed approaches zero, the time between successive $CL_1$ reset signals will increase until the $CL_1$ signal and the FIN signal occur substantially at the same time. If the FIN signal reaches the input 84-2 before the $CL_1$ signal reaches the input 84-1, the flip-flop 84 will reset to generate a 1 at the output 84-3 to the input 81-2 to disable the NOR gate 81. While the $CL_1$ and FIN signals are both present the flip-flop 84 will remain reset and the next counting time interval will not begin. This problem is avoided by the use of the $CL_2$ reset signal at the input 82-1 of the NOR gate 82 to set the flip-flop 84 when the $CL_1$ reset signal has not done so.

During the counting time interval, at least one of the digital count output lines 12-1 to 12-6 and 12-10 will be at 0 to generate a 1 from a NAND gate 85 of the zero velocity detector 41. The output of the NAND gate 85 is connected to an input 86-1 of a negative logic NOR gate 86 and an inverter 87 which changes the 1 to a 0 at an input 86-2 to generate a 0 at an output 86-3. When the maximum count has been recorded by the nonlinear counter, all the inputs to NAND gate 85 will be at 1 to generate a 0 at the input 86-1. The 0 will be changed to a 1 by the inverter 87 but will not reach the input 86-2 until a capacitor 88 is charged. Therefore, during the charging of the capacitor 88 both inputs of the NOR gate 86 will be at 0 to generate a 1 FIN signal to the counter gate 18 to stop the counting cycle.

The control logic circuit 15 also generates the $CL_2$ reset signal and the L latch signal in response to a count interval pulse on the input line 11. The element 89 is a J-K flip-flop which changes its output signals at a pair of outputs 89-4 and 89-5 according to input signals at a pair of inputs 89-2 and 89-3 when the signal at a clock input 89-1 changes from 1 to 0. If the inputs 89-2 and 89-3 are at 0, the outputs 89-4 and 89-5 will remain the same. If the inputs are at 1 the outputs will reverse their signals. If the input 89-2 is at 0 and the input 89-3 is at 1, the output 89-4 will become 0 and the output 89-5 will become 1. If the input 89-2 is at 1 and the input 89-3 is at 0, the output 89-4 will become 1 and the output 89-5 will become 0. A 0 at a clear input 89-6 will set output 89-4 to 0 and output 89-5 to 1.

Before the $CL_1$ reset signal is generated it will be assumed that the J-K flip-flop had been reset so that the output 89-4 is at 0 and the output 89-5 is at 1. The 0 from the output 89-4 is present at an input 91-1 of a negative logic NOR gate 91 and is changed to a 1 by an inverter 92 at an input 91-2 to generate a 0 from an output 91-3 on the line 21. After the $CL_1$ reset signal is generated, the line 14 will return to 0 to clock the flip-flop 89. Since the input 89-2 had been at 1 and the input 89-3 is grounded to produce a 0, the output 89-4 will change to 1 at the input 91-1. The 1 will be changed to 0 by the inverter 92 but will be delayed from reaching the input 91-2 while the capacitor 93 charges up. During this time both inputs to the NOR gate 91 will be at 1 and the line 21 will remain at 0. Before the $CL_1$ reset signal occurs the 1 from the output 89-5 is changed to a 0 by an inverter 94 and back to a 1 by an inverter 95 at the clear input 89-6. After the $CL_1$ reset signal the output 89-5 will become a 0 and will be changed to a 1 by the inverter 94 and, after a time delay $t_2$ to charge a capacitor 96, is changed back to a 0 to reset the flip-flop 89. When the flip-flop 89 resets, the output 89-4 will change to a 0 at the input 91-1 of the NOR gate 91. Prior to 89-4 changing to 0 the input 91-1 is at 1 and the input 91-2 is at 0. If the time delay $t_3$ of the capacitor 93 is less than the time delay $t_2$, the input 91-2 will remain at 0 as the capacitor 93 charges when the output 89-4 changes to 0 to generate a 1 $CL_2$ reset signal at the output 91-3 on the line 21. After the time delay $t_3$, the NOR gate 91 will have a 0 at the input 91-1 and a 1 at the input 91-2 to produce a 0 on the line 21 and remove the $CL_2$ reset signal.

The control logic circuit 15 also generates the L latch signal on the line 26. Before the $CL_1$ reset signal is generated, the 1 from the output 89-5 is present at an input 97-1 of a negative logic NAND gate 97 and the 0 from the zero velocity detector 41 is changed to a 1 by an inverter 98 at an input 97-2 to generate a 0 on the line 26. After the $CL_1$ reset signal, the output 89-5 will be at 0 for the time delay $t_2$ to change the output 97-3 to 1 to produce the L latch signal on the line 26. During the counting time interval, a subsequent count interval pulse will generate a second $CL_1$ reset signal which in turn will generate another L latch signal. If a second $CL_1$ reset signal is not received, a 1 FIN finish signal will be generated by the zero velocity detector 41 which is changed to a 0 $\overline{FIN}$ signal by the inverter 98 at the input 97-2 to generate a 1 L latch signal on the line 26 to the latch sections of FIG. 6.

The C count pulses on the line 54 enter the counter section 31 of FIG. 6 at an input 31-1. The counter section 31 is connected as a ripple through counter to generate the first four bits, $A_0$, $B_0$, $C_0$ and $D_0$, of the nonlinear counter. The $D_0$ output is connected to an input 32-1 of the counter section 32 to generate the second four bits of the nonlinear counter, $A_1$, $B_1$, $C_1$ and $D_1$. Finally, the $D_1$ output is connected to an input 33-6 of the counter section 33 to generate the last two bits of the nonlinear counter, $B_2$ and $C_2$. The counter section 33 also has an input 33-1 connected to the line 53 which receives the $f/256$ signal and the counter section generates a $f/512$ frequency at an output 33-2 on the line 52 to the frequency divider 35 of FIG. 5. The counter sections 31, 32 and 33 are all reset to zero by the 1 $CL_2$ reset signal on line 21 before the start of each counting time interval.

The nonlinear counter outputs $A_0$ to $B_1$ and $C_2$ are the inputs to the latch sections 42 and 43 with the least significant bit $A_0$ connected to a latch input 43-3 and the most signifiicant bit $C_2$ connected to an input 42-1. The element 42 is a latch section having the inputs 42-1 to 42-4 wherein data present at the inputs is transferred to the outputs 42-5 to 42-8 when the input at the clock inputs 42-9 and 42-10 changes from 0 to 1. The bits are latched onto the latch outputs by a 1 L latch signal when line 26 returns to 0. The least significant bit $A_0$ at the output 43-7 is an input to the amplifier 29. The latch outputs 42-6, 42-7, 42-8, 43-5 and 43-6, representing the number of counts accumulated during the last octave less the least significant bit, are the inputs, along with the most significant bit $C_2$ at the output 42-5, to the digital-to-analog converter 28. The signals at the inputs 28-1 to 28-6 of the converter 28 are inverted to produce a down count which is then converted to an analog signal at an output 28-7 which is another input to the amplifier 29. If the inputs 28-1 to 28-6 are a 0 which represents the maximum down count, an output 28-7 will be at the maximum negative output voltage and will become proportionally less negative as the C counts are accumulated.

The $C_1$, $D_1$, $B_2$ and $C_2$ outputs from the counter sections 32 and 33 are the inputs to the latch section 44 which latches these signals at the same time the latches 42 and 43 are actuated. The input signals are inverted by the latch 44 and are the inputs to the octave decoder and amplifier switch 45. The $C_0$, $D_0$, $A_1$ and $B_1$ outputs from the counter sections 31 and 32 are also the address inputs to the count decoder 37. After every four C count pulses the address at the inputs 37-17 to 37-20 will be incremented by one to select each of the outputs 37-1 to 37-16 in order and place a 0 on the selected output while holding the other outputs at 1. The count decoder 37 generates the $FS_m$ signals on the lines 51-1 to 51-16 to the NAND gates 38 and 39 to select one of the $f/(2^n)$, $f/(2^{n+1})$ and $f/(2^{n+2})$ signals at the frequency selector 36 for each four C count pulse section of the l/t curve.

The outputs from the latch section 44 are utilized by the octave decoder and amplifier switch 45 to generate the $\overline{G/2}$, $\overline{G/4}$ and $\overline{G/16}$ switch signals to the amplifier 29. Three negative logic NAND gates 99, 101 and 102 decode the inputs to generate a unique combination of switch signals for each octave. The outputs of the NAND gates 99 and 102 are inverted by a pair of inverters 103 and 104 respectively and all three outputs are the inputs to similar transistor switch circuits which generate the switch signals to the amplifier 29. Since the transistor switch circuits are similar, only the one which generates the $\overline{G/2}$ switch signal will be explained in detail. A PNP transistor 105 has its emitter grounded and its collector connected to a negative voltage source through a resistor 106. When the output of the inverter 103 is at 1, current will flow from the inverter 103 through a pair of diodes 107 and 108 and a resistor 109 to the negative voltage source. The base of the transistor 105 is connected between the diode 108 and the resistor 109 and the voltage drop across the diodes and the voltage drop across the resistor 109 are proportioned to provide a positive voltage at the base to turn the transistor off. Current will not flow through the transistor 105 but will flow in a resistor 111 in parallel with it. The resistors 106 and 111 are a voltage divider and the negative voltage across the resistor 111 is the $\overline{G/2}$ switch signal. If the output of the inverter 103 is at 0, the voltage drop across the diodes 107 and 108 will produce a negative voltage at the base of the transistor 105 to turn it on. The "on" transistor 105 will reduce the resistance between the resistor 106 and ground thereby increasing the current flow through and the voltage drop across the resistor 106. Therefore, the voltage drop across the resistor 111 will be decreased toward zero voltage to remove the $\overline{G/2}$ switch signal.

The least significant bit $A_0$ from the latch output 43-7 is an input to the amplifier 29. A diode and resistor circuit inverts the $A_0$ signal and scales it before it is added to the digital-to-analog converter 28 output signal. If the $A_0$ signal is 0, current will flow through a pair of diodes 112 and 113 and a resistor 114 to a negative voltage source. Current will also flow through the diodes 112 and 113 and through a diode 115 and a resistor 116 to the same source of negative voltage. Therefore, the voltage at the junction of the diode 115 and the resistor 116 will be approximately three diode forward voltage drops below the 0 voltage level which is at or near zero volts. If the output 28-7 of the digital-to-analog converter 28 is also at zero, current will flow through a diode 117 and the resistor 116 to the source of negative voltage to pull the junction between the diode 117 and the output 28-7 approximately two diode forward voltage drops below zero voltage. This negative voltage is applied to a non-inverting input 118-1 of an amplifier 118 through a resistor 119 to indicate the presence of the inverted least significant bit. If the $A_0$ bit is at 1 current will flow through the diodes 112, 113 and 115 and the resistor 116, but the three diode forward voltage drop will be less than the positive voltage indicating the 1 so that the diode 117 is reverse biased and the junction between the diode 117 and the output 28-7 will remain at 0 to indicate the absence of the inverted least significant bit. As the C count pulses are accumulated, the output from the digital-to-analog converter 28 will become proportionally less negative from the maximum negative output voltage and current will flow from ground through a resistor 121 to the output 28-7 to produce a negative voltage which is added to the voltage representing the least significant bit at the junction between the diode 117, the output 28-7 the resistor 121 and the resistor 119.

The digital-to-analog converter 28 output voltage and the $A_0$ bit voltage are applied to the non-inverting input 118-1 of the amplifier 118 which amplifies these signals at an output 118-3 and applies the output voltage to an inverting input 122-2 of an amplifier 122 through a pair of resistors 123 and 124. The amplifier 122 inverts the voltage and amplifies it to generate a signal at an output 122-3 representing the analog equivalent of the velocity $v$ at the time $t$ on the $1/t$ curve of FIG. 1. The total amplification of the amplifiers 118 and 122 is designated as G and this gain is divided by $2^n$ where $n$ is the number of the octave in which the counting terminated. When $n = 0, 2, 4$ and 6, during the even numbered octaves, the $\overline{C_1}$ and $\overline{C_2}$ inputs to the decoder and switch 45 will be at 1 to generate the negative voltage $\overline{G/2}$ signal. The $\overline{G/2}$ signal is the input to a field effect transistor FET 125 to turn the FET off and place the full input voltage at the input 118-1. When $n = 1, 3, 5$ and 7, during the odd numbered octaves, the $\overline{C_1}$ input will change to 0 and the $\overline{C_2}$ input will remain at 1 to remove the $\overline{G/2}$ signal and turn on the FET 125. When the FET 125 is turned on the resistor 119 and a resistor 126 will function as a voltage divider to divide the input voltage and therefore amplification by a factor of two.

When $n = 0, 1, 4$ and 5, the $\overline{C_2}$ and $\overline{D_1}$ inputs to the decoder and switch 45 will be at 1 to generate the G/4 signal. The G/4 signal is the input to a FET 127 to turn it on. When the FET 127 is turned on, an inverting input 118-2 is connected to ground through a resistor 128. The output voltage at an output 118-3 is divided by a feedback resistor 129 and the resistor 128 to place a relatively small portion of the output voltage at the input 118-2 to maintain the amplification of the amplifiers 118 and 122 at G. When $n = 2, 3, 6$ and 7, the $\overline{D_1}$ input to the decoder and switch 45 will change to 0 and the $\overline{C_2}$ input will remain at 1 to remove the G/4 signal and turn off the FET 127. When the FET 127 is turned off a resistor 131 is placed in series with the resistors 128 and 129 and a relatively larger portion of the output voltage is placed at the input 118-2 which decreases the amplification of the amplifier 118 and the total amplification G by a factor of four.

When $n = 0, 1, 2$ and 3, the $\overline{B_2}$ and $\overline{C_2}$ inputs to the decoder and switch 45 are at 1 to generate the $\overline{G/16}$ signal and turn off a FET 132 across a resistor 133. The resistor 133 and a resistor 134 are the feedback resistors for the amplifier 122 and maintain the gain of the amplifier 122 at a value which produces an overall amplification of G, G/2, G/4 or G/8 in response to the output from the amplifier 118. When $n = 4, 5, 6$ and 7, the $\overline{B_2}$ changes to 0 and the $\overline{C_2}$ input will remain at 1 to remove the $\overline{G/16}$ signal and turn on the FET 132. The FET 132 short-circuits the resistor 133 to enable a larger portion of the voltage at the output 122-3 to reach the inverting input 122-1 and divide the amplification by a factor of sixteen.

From the foregoing it may be seen that the amplification of the down counter output signal is divided by a factor of $2^n$ as successive octaves are counted to a value of G/128 during the eigth octave. During the ninth octave or straight line portion of the $1/t$ curve, the $\overline{C_2}$ input will change to 0 to remove the $\overline{G/2}$, G/4 and $\overline{G/16}$ signals and generate the G/128 amplification. When there is a change in the direction of travel of the object which occurs between a pair of count interval pulses, that pair of pulses no longer defines a counting interval. An FET 135 is connected between ground and the junction between the resistors 123 and 124, and is normally turned off by a negative voltage on a line 136. When a change in direction occurs, a 0 is applied to the line 136 to turn on the FET 135 and ground the output 118-3 of the amplifier 118 to obtain a zero velocity output. After a pair of count intervals pulses is received with no change in direction, a negative voltage is applied to the line 136 to turn the FET 135 off.

A conventional method of indicating the direction of travel of an object along a predetermined path is to reverse the polarity of the speed signal when the direction of travel is reversed. If it is desired to sum the analog output voltage on the line 13 with a speed pattern signal to obtain a speed error for controlling a drive motor, the analog output voltage should be of the opposite polarity of that of the pattern signal. Typically, a positive pattern voltage may represent an up direction of travel in an elevator system. Referring to the amplifier 29 of FIG. 6, the counter output enters the amplifier 118 as a negative voltage and is inverted to a positive voltage by the amplifier 122. For an up direction of travel a positive voltage is applied to the up line 46 while the down line 47 is grounded. The positive voltage on the up line 46 will turn off an FET 137 to block the output from the amplifier 122 from the output line 13. The grounding of the down line 47 turns on an FET 138 which connects an output 139-3 of an amplifier 139 to the output line 13. The amplifier 139 has a unity gain and inverts the output from the amplifier 122, which is applied to an inverting input 139-2 through a resistor 141, to generate a negative analog output signal on the output line 13. A down direction of travel is indicated by a positive voltage on the down line 47 while the up line 46 is grounded. The positive voltage on the down line 47 turns off the FET 138 to block the output from the amplifier 139 from the output line 13. The grounding of the up line 46 will turn on the FET 137 to connect the amplifier 122 to the analog output line 13 to produce a positive analog output signal which may be summed with a negative down speed pattern signal.

The digital output signals on the digital output lines 12-1 to 12-10 can also be utilized to generate a speed error signal. The signals on the lines 12-1 to 12-10 must be inverted, by inverters (not shown) for example, to provide a down count representing the velocity of the object as it travels along a predetermined path. These signals may then be inputted into a digital computer (not shown) which derives the speed error signal from the digital output speed signal and a digital speed pattern signal which may be stored in the computer memory. The up and down direction of travel lines 46 and 47 can also be inputs to the computer to indicate the direction of travel of the object. The speed error signal is then utilized to control the speed of the object. In the alternative, the digital output speed signal and the digital speed pattern signal can also be combined at a digital summing point to obtain the speed error signal which must be changed to analog form to be utilized to control the speed of the object.

The present invention generates a velocity signal which is a stepped approximation to a velocity versus time $1/t$ curve where $t$ represents the time required to travel a predetermined distance. A first count interval pulse on the input line 11 initiates a pulse count accumulation in the up counter 16 which defines the maximum velocity V which can be measured and the time interval T which defines it. Then the nonlinear down counter 19 is actuated to approximate the $1/t$ curve during a succession of octaves which are defined by a time base of $2^n(T)$ where $n$ is the number of octaves. The number of octaves completed and the nonlinear down counter 19 output define the measured velocity $v$ for the time interval $t$ and is available as a digital output signal on the output lines 12 or as an analog output signal on the output line 13.

Figure 7:
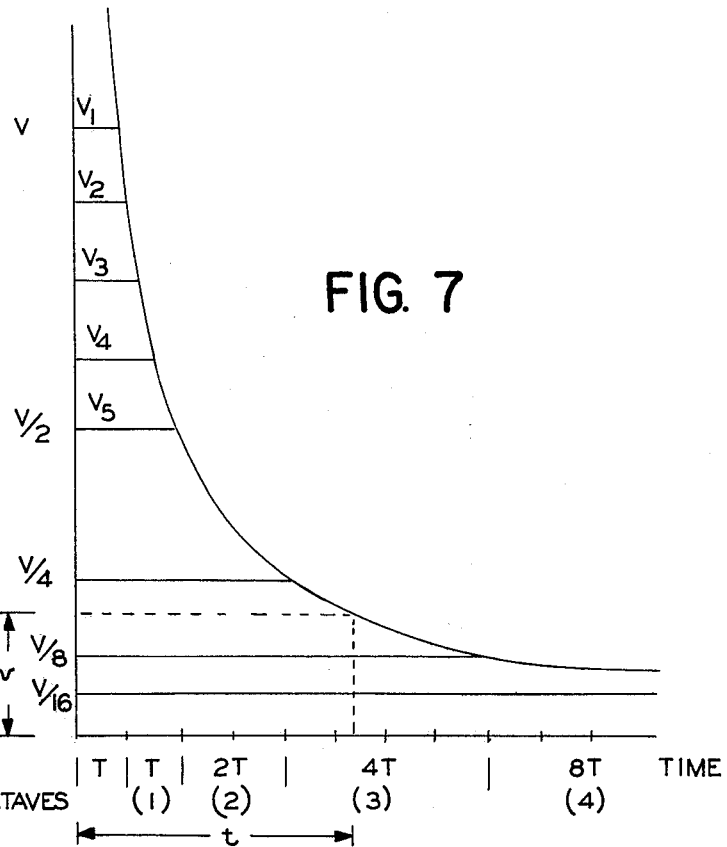
FIG. 7 is a plot of velocity against time required to travel a predetermined distance showing five maximum velocities.

Referring to FIG. 7, there is shown a plot of velocity against time required to travel a predetermined distance as shown in FIG. 1 including a plurality of maximum velocities $V_1$ to $V_5$ as might be generated where the count interval pulses are derived from a pulse generator attached to a drive motor shaft and the object may be driven through several different combinations of gear ratios. For example, $V_1 = V$, $V_2 = 7V/8$, $V_3 = 3V/4$, $V_4 = 5V/8$ and $V_5 = V/2$. In order to maintain the maximum velocity time interval at T, the frequency from the clock 17 must be scaled so that $V = V_1 = V_2 = V_3 = V_4 = V_5$.

Figure 8:
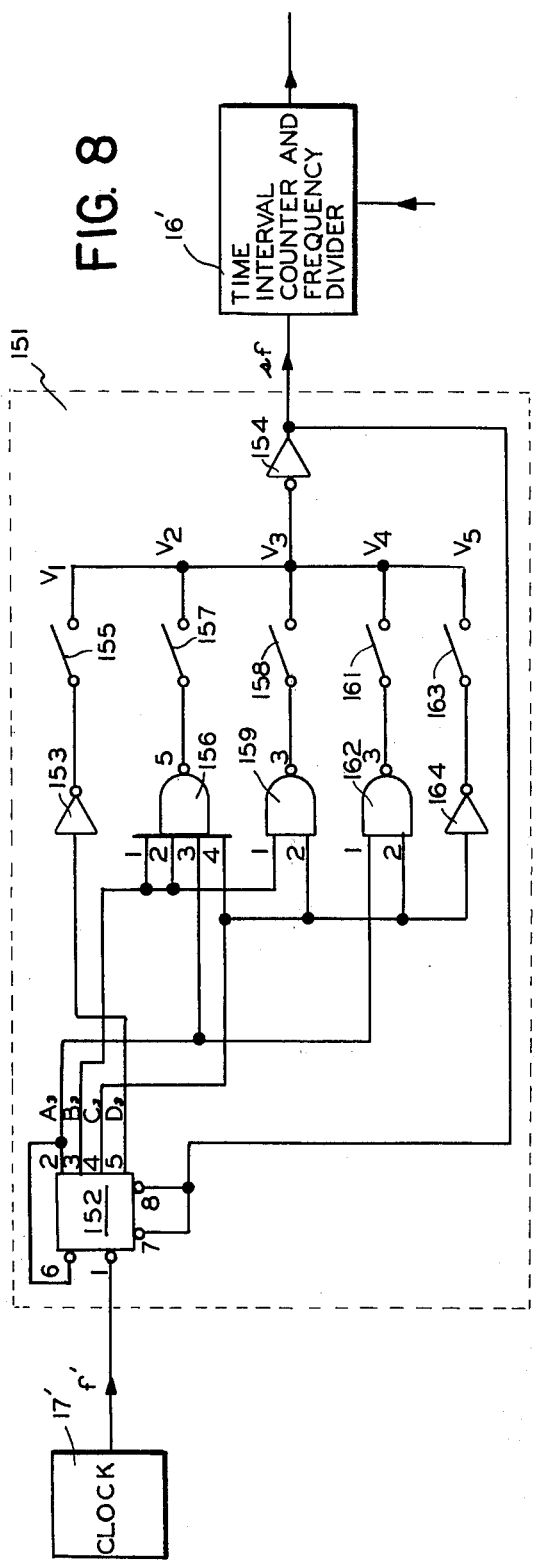
FIG. 8 is a logic diagram of an alternate embodiment of the present invention for obtaining the five maximum velocities shown in FIG. 7.

Referring to FIG. 8, there is shown a scaling circuit 151 connected between a clock 17' and a time interval counter and frequency divider 16'. The clock 17' is free-running and generates a train of pulses at a frequency $f'$ which is scaled by the scaling circuit 15' to generate a train of pulses at a frequency $sf$ which is the input to the time interval counter and frequency divider 16'. The scaling circuit 151 includes a four-bit binary counter 152 which is connected to generate the signals $f'/2$, $f'/4$, $f'/8$ and $f'/16$ at the outputs 152-2 to 152-5 respectively when the signal $f'$ is applied to an input 152-1. The $D_3$ or $f'/16$ frequency signal is inverted by an inverter 153 and is connected to a second inverter 154 by a nomally open switch 155. If V is to equal $V_1$ the switch 155 is closed. During the first eight pulses from clock 17' the output 152-5 will be at 0 which is changed to a 1 by the inverter 153 and back to a 0 by the inverter 155 to enable the counter 152 at a pair of reset inputs 152-7 and 152-8. After the eighth pulse from the counter 17' the output 152-5 will change to a 1 which is inverted twice to reset the counter 152 at the reset inputs 152-7 and 152-8 and change the output 152-5 back to 0. The 1 from the inverter 154 is counted by the counter 16' and if the clock frequency $f'$ is equal to eight times the $f$ frequency of the previous embodiment, the stepped approximation to the $1/t$ curve will be generated as shown in FIG. 4 with the scaling factor $s$ equal to 1.

If the full scale velocity V is to be equal to $V_2$, the $f'$ pulse train must be scaled to reflect the relation that $V_2 = 7V/8$. The $A_3$, $B_3$ and $C_3$ outputs from the counter 152 are the inputs to a NAND gate 156. An output 156-5 of the NAND gate 156 is connected to the inverter 154 by a normally open switch 157. During the first four $f'$ pulses the output 152-4 will generate a 0 to an input 156-4 of the NAND gate 156. The NAND gate 156 will generate a 1 through the closed switch 157 to the inverter 154 which changes the 1 to a 0 to enable the counter 152 at the reset inputs 152-7 and 152-8. During the fifth and sixth $f'$ pulses the output 152-3 generates a 0 at a pair of inputs 156-1 and 156-2 to produce an enabling 0 from the inverter 154. During the seventh $f'$ pulse the output 152-2 generates a 0 at an input 156-3 to produce an enabling 0 from the inverter 154. After the seventh $f'$ pulse all the outputs 152-2, 152-3 and 152-4 will be at 1 to generate a 0 from the NAND gate 156 which is changed to a 1 by the inverter 154 to be counted by the counter 16' and to reset the counter 152 to zero. The scaling factor $s$ therefore is equal to the improper fraction 8/7 since eight pulses are generated to the counter 16' for $V_2$ in the same amount of time required to generate seven pulses for $V_1$. Since the count frequency is proportional to the velocity, $sf \approx sV_2$, and $V_2 = 7V/8$ from FIG. 7, the scaled velocity $V_2$ will be equal to $s(7)V/8 = (8/7)7V/8 = V$ and full scale velocity will be scaled up from $V_2$ to V at time T.

If the full scale velocity V is to be equal to $V_3$, a switch 158 is closed to connect an output 159-3 of a NAND gate 159 to the inverter 154. During the first four $f'$ pulses the output 152-4 generates a 0 to an input 159-2 to produce a 1 from the NAND gate 159. The 1 is passed through the closed switch 158 and is changed to a 0 by the inverter 154 to enable the counter 152. During the fifth and sixth $f'$ pulses the output 152-3 generates a 0 to enable the counter 152. After the sixth pulse the 152-3 and 152-4 outputs are both at 1 to generate a 0 from the output 159-3 which is changed to a 1 by the inverter 154. The 1 is counted by the counter 16' and also resets the counter 152 to zero. The scaling factor $s$ therefore is equal to the improper fraction 8/6 and the full scale velocity will be scaled from $V_3$ to V at time T.

If the full scale velocity V is to be equal to $V_4$, a switch 161 is closed to connect an output 162-3 of a NAND gate 162 to the inverter 154. During the first four $f'$ pulses the output 152-4 generates a 0 to an input 162-2 to produce a 1 from the NAND gate 162. The 1 is passed through the closed switch 161 and is changed to a 0 by the inverter 154 to enable the counter 152. During the fifth $f'$ pulse the output 152-2 generates a 0 to enable the counter 152. After the fifth pulse the 152-2 and 152-4 outputs are both at 1 to generate a 0 from the output 159-3 which is changed to a 1 by the inverter 154. The 1 is counted by the counter 16' and also resets the counter 152 to zero. The scaling factor $s$ therefore is equal to the improper fraction 8/5 and the full scale velocity will be scaled from $V_4$ to V at time T.

Finally, if the full scale velocity V is to be equal to $V_5$, a switch 163 is closed to connect an inverter 164 to the inverter 154. During the first four $f'$ pulses the output 152-3 generates a 0 which is changed to a 1 by the inverter 164 and changed back to a 0 by the inverter 154 to enable the counter 152. After the fourth pulse the output 152-$ is at 1 which is changed to a 0 by the inverter 164 and back to a 1 by the inverter 154. The 1 is counted by the counter 16' and also resets the counter 152 to zero. The scaling factor $s$ therefore is equal to the improper fraction 8/4 and the full scale velocity will be scaled from $V_5$ to V at time T.

Figure 9:
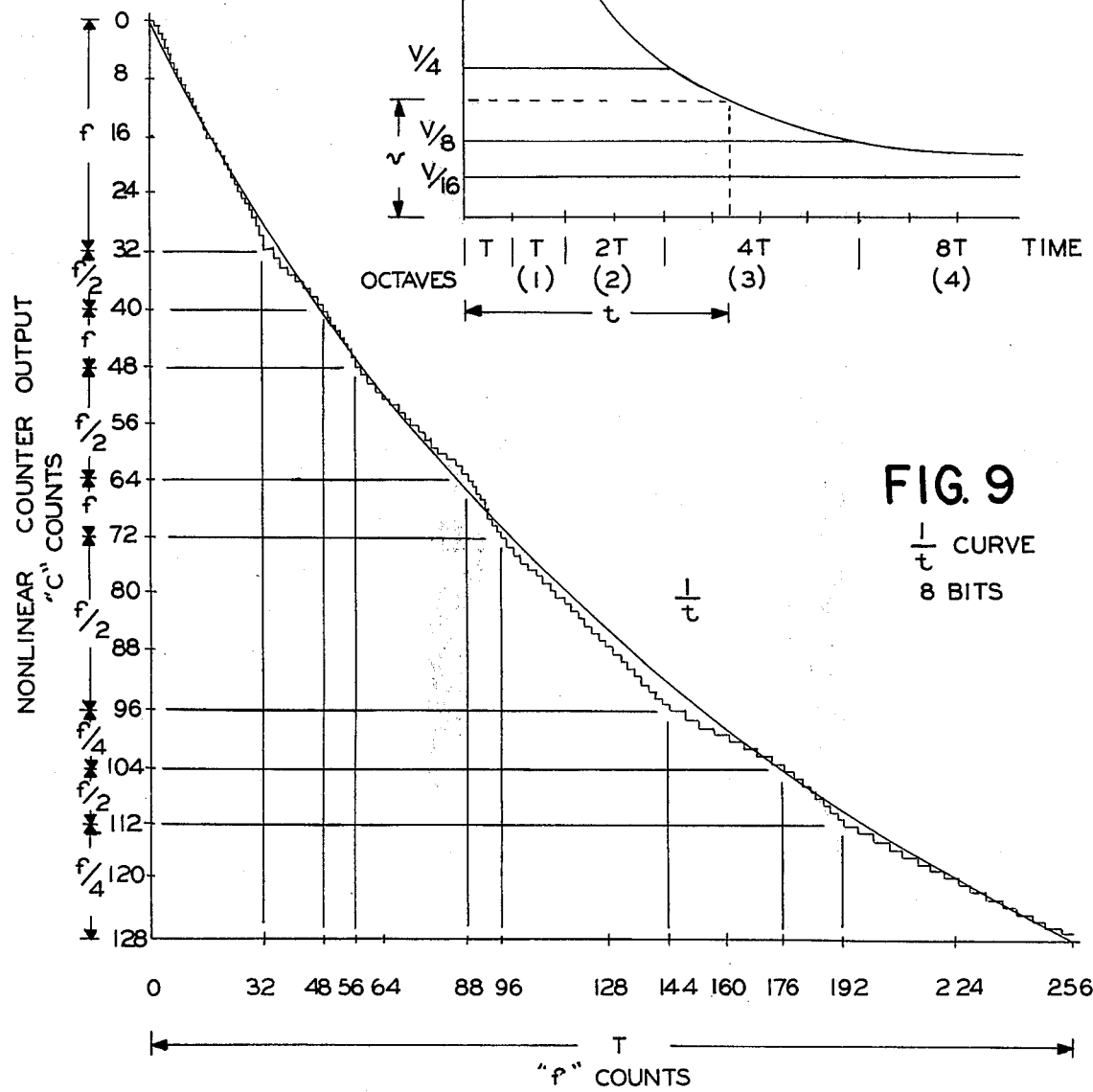
FIG. 9 is a plot of the stepped approximation of a velocity versus time $1/t$ curve generated by an alternate embodiment of the present invention having an additional counter bit for obtaining higher resolution.
Figure 10:
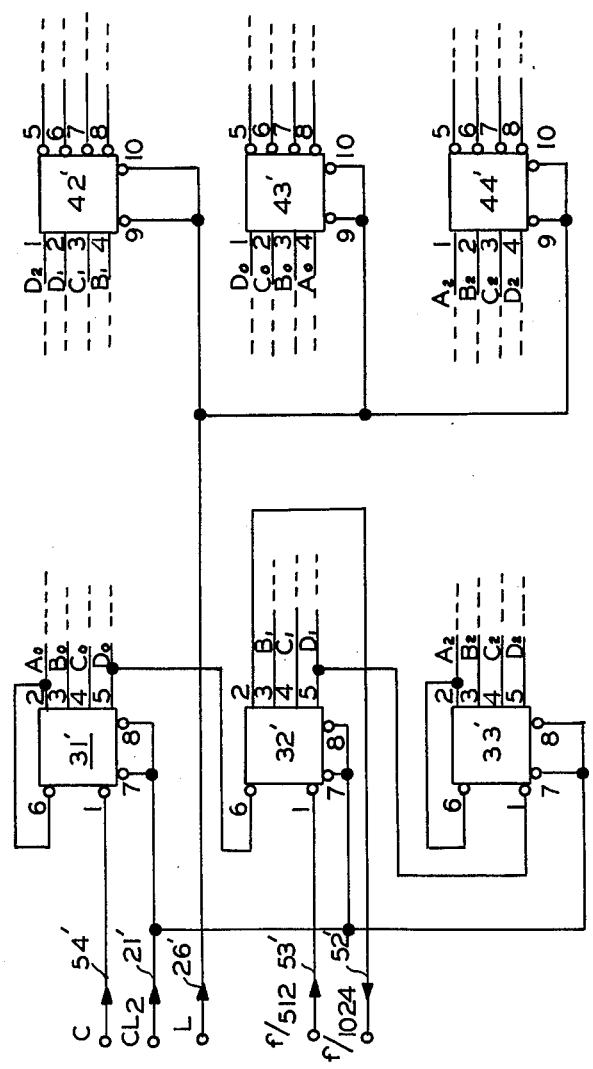
FIG. 10 is a logic diagram of the alternate embodiment of the present invention showing the additional counter bit for generating the curve of FIG. 9.

FIG. 9 is a plot of the stepped approximation of a $1/t$ curve generated by an alternate embodiment of the present invention having an additional counter bit for obtaining higher resolution. The down counter output in C counts and the time interval T in $f$ counts have both been doubled to double the number of steps which approximate the $1/t$ curve. FIG. 10 is a logic diagram of a portion of an alternate embodiment of the present invention having an eighth counter bit for generating the curve of FIG. 9.

The C count pulses enter a four bit binary counter section 31' of a nonlinear counter from a line 54' as generated from a counter gate similar to the counter gate 18 of FIG. 2. The counter section 31' divides the C count pulses at an input 31'-1 by 2, 4, 8 and 16 at the outputs 31'-2, 31'-3, 31'-4 and 31'-5 respectively to generate the $A_0$, $B_0$, $C_0$ and $D_0$ bits of the octave. The $D_0$ output is the input to an input 32'-6 of a counter section 32' which divides the C count pulses by 32, 64 and 128 at the outputs 32'-3, 32'-4 and 32'-5 respectively to generate the $B_1$, $c_1$ and $D_1$ bits of the octave. These bits represent the maximum nonlinear C count of 128 as shown on FIG. 9. The $D_1$ output is the input to an input 33'-1 of a counter section 33' which divides the C count pulses by 256, 512, 1024 and 2048 at the outputs 33'-2 to 33'-5 respectively to generate the $A_2$, $B_2$, $C_2$ and $D_2$ bits. The $A_2$, $B_2$ and $C_2$ bits represent the number of octaves completed and are utilized to address a frequency multiplexer similar to the frequency multiplexer 22 of FIG. 2. The $D_2$ output represents the completion of eight octaves and defines the straight line portion of the $1/t$ curve. A $CL_2$ reset signal can be entered on a line 21' to reset each counter section to zero at the reset inputs 31'-7, 31'-8, 32'-7, 32'-8, 33'-7, and 33'-8 before each counting cycle. An input 32'-1 of the counter section 32' receives a $f/512$ pulse train on a line 53' and divides it by two at an output 32'-2 to generate a $f/1024$ pulse train on a line 52' which is utilized in the straight line portion of the $1/t$ curve.

The $A_0$ to $D_0$, $B_1$ to $D_1$ and $A_2$ and $D_2$ bits are latched into the latch sections 42', 43' and 44'. Data on the latch inputs is transferred to the latch outputs when a latch signal L is received on a line 26' at the clock inputs 42'-9, 42'-10, 43'-9, 43'-10, 44'-9 and 44'-10. The latch outputs 42'-5 to 42'-8 generate the complement of the input signals to produce a down count from the output of the nonlinear counter sections 31', 32' and 33'.

It is to be understood that the above disclosed tachometer lends itself to modification both as to the individual elements thereof and their combination without departing from its spirit and scope. For example, the frequency of the free running clock and the capacity of the nonlinear counter may be increased or decreased to obtain higher or lower resolution. Also the number of C count pulses during which the counting frequency remains the same may be reduced from four to provide a better fit to the $1/t$ curve. Accordingly, it is to be appreciated that the detailed example set forth above is for illustrative purposes and is not to be read in a limiting sense.

We claim:

1. An apparatus for generating output signals representing velocity as a function of the time required for an object to travel a predetermined distance comprising:

means for defining a time interval representing the time required for said body to travel a predetermined distance;

clock means responsive to said means for defining a time interval for generating a train of clock pulses at a predetermined frequency;

frequency generating means responsive to said clock pulse train for generating said clock pulses in a predetermined series of plurality of predetermined rates; and counting means responsive to said clock pulses in a predetermined series of a plurality of predetermined rates for generating a series of discrete values which define a stepped approximation of a velocity versus time curve for said output signal.

2. An apparatus according to claim 1 for defining the velocity of a moving object including means to store the discrete value which is generated at the termination of said time interval as defined by said means for defining a time interval.

3. The apparatus defined in claim 1 wherein said means for defining a time interval includes a source of count interval pulses spaced apart by said time interval and control means responsive to said count interval pulses for generating a signal to actuate said clock means.

4. The apparatus defined in claim 3 wherein said means defining a time interval defines a succession of time intervals as said body travels and wherein said control means generated signal is repetitively generated for each time interval.

5. The apparatus defined in claim 1 wherein said clock means includes a free-running clock for generating the pulses of said clock pulse train at a predetermined frequency.

6. The apparatus defined in claim 1 wherein said frequency generating means responsive to said clock pulses include frequency dividing means for dividing the frequency of said train of clock pulses to generate said clock pulses at a plurality of predetermined rates and frequency selecting means connected to said frequency dividing means for selecting each of said plurality of predetermined rates in a predetermined order and wherein said counting means includes a counter connected to said frequency selecting means for accumulating said clock pulses to generate said output signal.

7. An apparatus for generating an output signal representing the detected velocity of a moving body, comprising:
   means for defining a time interval representing the time required for said body to travel a predetermined distance;
   clock means responsive to said means for defining a time interval for generating a train of clock pulses at a selected one of a plurality of predetermined frequencies;
   frequency generating means responsive to said clock pulse train for generating said clock pulses at a plurality of predetermined rates; and
   counting means responsive to said clock pulses at a plurality of predetermined rates for generating a series of discrete values which define a stepped approximation of a velocity versus time curve for said output signal.

8. The apparatus defined in claim 7 wherein said means for defining a time interval includes a source of count interval pulses spaced apart by said time interval and control means responsive to said count interval pulses for generating a signal to actuate said clock means.

9. The apparatus defined in claim 7 wherein said clock means includes a free-running clock for generating the pulses of a clock pulse train at a first predetermined frequency, frequency dividing means connected to said free-running clock for dividing said pulse train frequency to generate a plurality of pulse trains at a plurality of predetermined frequencies and multiplexer means connected to said frequency dividing means for generating said train of clock pulses at a selected one of said plurality of predetermined frequencies.

10. The apparatus defined in claim 9 wherein said multiplexer means generates said train of clock pulses at a selected one of said plurality of predetermined frequencies in response to one of a plurality of address signals from said means for counting.

11. The apparatus defined in claim 7 wherein said frequency generating means responsive to said clock pulses includes frequency dividing means connected to said clock means for dividing said train of clock pulses at a selected one of said plurality of predetermined frequencies to generate said clock pulses at a plurality of predetermined rates and frequency selecting means connected to said frequency dividing means for selecting each one of said plurality of predetermined rates in a predetermined order and wherein said counting means includes a counter connected to said frequency selecting means for accumulating said clock pulses to generate said output signal.

12. The apparatus defined in claim 11 wherein said means for counting said clock pulses includes gate means connected between said frequency selecting means and said counter for inhibiting said clock pulses during a first portion of said time interval.

13. A tachometer for generating an output signal representing the detected velocity of a moving object, comprising:
   means for defining a time interval representing the time required for said object to travel a predetermined distance;
   first means responsive to said means for defining a time interval for generating a train of clock pulses at a first predetermined frequency;
   second means responsive to said means for defining a time interval for generating a train of clock pulses at a second predetermined frequency;
   frequency generating means responsive to said clock pulses of said first frequency for generating said clock pulses at at least two predetermined rates; and
   counting means responsive to said clock pulses of said first frequency at at least two predetermined rates during a first portion of said time interval and responsive to said clock pulses of said second frequency during a second portion of said time interval for generating a series of discrete values which define a stepped approximation of a velocity versus time curve for said output signal during said first portion of said time interval and a stepped approximation of a straight line for said velocity versus time curve during said second portion of said interval.

14. A tachometer for generating an output signal representing the detected velocity of a moving object, comprising:
   means for defining a time interval representing the time required for said object to travel a predetermined distance,
   clock means responsive to said means for defining a time interval for generating a train of clock pulses at a predetermined frequency;
   scaling means for multiplying said predetermined frequency by a factor represented as an improper fraction; and
   frequency generating means responsive to said clock pulses of said scaled frequency for generating said clock pulses at a plurality of predetermined rates; and
   counting means responsive to said clock pulses of said scaled frequency at a plurality of predetermined rates for generating a series of discrete values which define a stepped approximation of a velocity versus time curve for said output signal.

15. A tachometer for generating an output signal representing the detected velocity of a moving object, comprising:
   means for defining a first time interval representing the time $t$ required for said body to travel a predetermined distance;
   means for defining a second time interval representing the time T required for said body to travel said predetermined distance at its maximum velocity V;
   clock means responsive to said means for defining a first time interval for generating a plurality of trains of clock pulses at a purality of predetermined frequencies;
   frequency generating means responsive to said clock pulse trains at a plurality of predetermined frequencies for generating said clock pulses at a plurality of predetermined rates;
   counting means responsive to said means for defining a second time interval and to said clock pulses at a plurality of predetermined rates for generating a series of discrete values which define a stepped approximation of a velocity versus time curve for said output signal; and
   means connected between said clock means and said means for counting and responsive to the output of said means for counting for selecting each one of said predetermined frequencies generated by said clock means in a predetermined order.

16. The tachometer defined in claim 15 wherein said means for defining a first time interval $t$ includes a source of count interval pulses spaced apart by said first time interval $t$ and control means responsive to said count interval pulses for generating a first signal to actuate said clock means.

17. The tachometer defined in claim 16 wherein said means for defining a second time interval T includes gate means connected between said means for selecting and said means for counting for inhibiting said clock pulses during said second time interval T and passing said clock pulses in response to said first signal and an initiate counting signal from said clock means after a predetermined number of clock pulses have been generated by said clock means.

18. The tachometer defined in claim 15 wherein said clock means includes a free-running clock for generating the pulses of a clock pulse train at a first predetermined frequency and frequency dividing means connected to said free-running clock for dividing said pulse train frequency at a first predetermined frequency to generate a plurality of pulse trains at a plurality of predetermined frequencies.

19. The tachometer defined in claim 18 wherein said clock means includes scaling means for multiplying said first predetermined frequency by a factor represented as an improper fraction connected between said free-running clock and said frequency dividing means.

20. The tachometer defined in claim 18 wherein said frequency dividing means divides said first predetermined frequency by powers of two, $2^n$, where n is an integer number.

21. The tachometer defined in claim 15 wherein said frequency generating means includes frequency dividing means connected to said means for selecting for dividing said selected frequency to generate said clock pulses at a plurality of predetermined rates, and frequency selecting means connected to said frequency dividing means for selecting each one of said plurality of predetermined rates in a predetermined order and wherein said counting means includes a counter connected to said frequency selecting means for accumulating said clock pulses to generate said output signal.

22. The tachometer defined in claim 21 wherein said frequency dividing means divides said selected frequency by powers of two.

23. The tachometer defined in claim 21 wherein said frequency generating means includes octave decoding means for generating address signals to said frequency selecting means to select said predetermined rates in said predetermined order in response to the output signal from said counter.

24. The tachometer defined in claim 15 wherein said frequency generating means includes means for generating a train of clock pulses at a frequency different from any one of said plurality of predetermined frequencies and gate means responsive to the output signal of said means for counting for selecting said selected predetermined frequencies from said means for selecting or selecting said different frequency.

25. The tachometer defined in claim 24 wherein said predetermined frequencies are related by powers of two, $2^n$, where $n$ is an integer number and said different frequency is eight times the highest one of said predetermined frequencies.

26. The tachometer defined in claim 15 wherein said means for counting includes latch means for storing said output signal in response to a latch signal generated by said means for defining a first time interval.

27. The tachometer defined in claim 15 wherein said means for counting generates said output signal in digital form and includes a digital to analog converter for generating said output signal in analog form.

28. The tachometer defined in claim 15 wherein said means for counting includes a first counter means for counting clock pulses at a plurality of predetermined rates for each one of said selected predetermined frequencies and said frequency generating means includes a second counter means for counting the number of times said first counter means reaches its maximum capacity.

29. The tachometer defined in claim 28 wherein said means for counting includes a digital to analog converter for generating an analog signal in response to the output of said first counter means, decoder means for generating a plurality of switch signals in response to the output of said second counter means and amplifier means responsive to said analog signal and said plurality of switch signals for generating said output signal in analog form.

30. The tachometer defined in claim 28 wherein said means for counting includes detector means for inhibiting said means for defining a first time interval t to terminate the counting of said first and second counter means in response to both said first and second counter means reaching their maximum capacities.

31. A tachometer for generating an output signal representing the detected velocity of a moving object, comprising:
means for defining a variable time interval representing the time required by said object to travel a predetermined distance;
means responsive to said time interval defining means for generating a series of pulse trains each having a given frequency and number of pulses wherein the frequency of each successive pulse train is less than the frequency of each preceeding pulse train; and
means responsive to the number of said pulse trains completed and the number of pulses generated in each of said pulse trains which are incomplete at the termination of said time interval for generating said output signal representing the velocity of said object during said variable time interval.

32. The tachometer defined in claim 31 wherein said time interval defining means includes means for dividing said variable time interval into a plurality of successive fixed time intervals and said pulse train generating means generates a selected one of said series of pulses trains during each one of said fixed time intervals.

33. The tachometer defined in claim 31 wherein said pulse train responsive means includes means for counting the pulses of each of said pulse trains at a plurality of predetermined rates.

* * * * *

UNITED STATES PATENT OFFICE
CERTIFICATE OF CORRECTION

Patent No. 3,968,434           Dated July 6, 1976

Inventor(s) GEORGE SCOTT DIXON, et al.

It is certified that error appears in the above-identified patent and that said Letters Patent are hereby corrected as shown below:

Column 3, line 15 change "y" to -- v --.
Column 4, line 25 change "rests" to -- resets --.
Column 4, line 25 change "wth" to -- with --.
Column 9, line 3 change "tomove" to -- to move --.
Column 9, line 43 remove "set".
Column 11, line 17 change "NANd" to -- NAND --.
Column 11, line 37 change "gate" to -- gates --.

Column 16, line 21 change "$B_2$" to -- $\bar{B}_2$ --.
Column 19, line 16 change "152-$" to -- 152-4 --.
Column 19, line 43 change "$c_1$" to -- $C_1$ --.
Column 19, line 67 after "42'-8" insert -- and 43' - 5 to 43' - 8 --.

Signed and Sealed this

Eighteenth Day of July 1978

[SEAL]

Attest:

RUTH C. MASON
*Attesting Officer*

DONALD W. BANNER
*Commissioner of Patents and Trademarks*